(12) United States Patent
Yano et al.

(10) Patent No.: US 8,798,919 B2
(45) Date of Patent: Aug. 5, 2014

(54) DRIVING CHARACTERISTICS DETECTOR AND ROUTE SEARCH DEVICE

(75) Inventors: Makoto Yano, Chiryu (JP); Masayuki Narita, Kariya (JP); Hiroki Ukai, Nagoya (JP)

(73) Assignee: DENSO CORPORATION, Kariya (JP)

( * ) Notice: Subject to any disclaimer, the term of this patent is extended or adjusted under 35 U.S.C. 154(b) by 368 days.

(21) Appl. No.: 13/194,296

(22) Filed: Jul. 29, 2011

(65) Prior Publication Data

US 2012/0029801 A1    Feb. 2, 2012

(30) Foreign Application Priority Data

Aug. 2, 2010    (JP) .................................. 2010-173904

(51) Int. Cl.
*G01C 21/00*    (2006.01)
(52) U.S. Cl.
USPC .......... 701/428; 701/32.5; 701/420; 701/423; 701/424
(58) Field of Classification Search
USPC ............... 701/32.5, 33.4, 117, 118, 119, 420, 701/423, 424, 428
See application file for complete search history.

(56) References Cited

U.S. PATENT DOCUMENTS 6,957,142 B2 * 10/2005 Entenmann .................... 701/117
7,162,361 B2 * 1/2007 Heinrichs-Bartscher ..... 701/117
7,248,962 B2 * 7/2007 Heinrichs-Bartscher ..... 701/117
2010/0023245 A1 * 1/2010 Huang et al. .................. 701/117
2011/0246016 A1 * 10/2011 Vang et al. ..................... 701/29

FOREIGN PATENT DOCUMENTS

| JP | A-2006-300780 | 11/2006 |
|---|---|---|
| JP | A-2006-323876 | 11/2006 |
| JP | A-2007-263903 | 10/2007 |
| JP | A-2008-107155 | 5/2008 |
| JP | A-2009-031046 | 2/2009 |
| JP | A-2010-079665 | 4/2010 |
| WO | WO 2010/021036 A1 | 2/2010 |

OTHER PUBLICATIONS

Office Action mailed on Aug. 28, 2012 issued in corresponding JP application No. 2010-173904 (and English translation).
Office Action dated Nov. 6, 2013 in the corresponding CN application No. 201110223664.0 (English translation).

* cited by examiner

*Primary Examiner* — Khoi Tran
*Assistant Examiner* — Jorge Peche
(74) *Attorney, Agent, or Firm* — Posz Law Group, PLC

(57) ABSTRACT

A driving characteristics detector includes: a driving information obtaining element for obtaining driving information, which relates to a driving condition of a vehicle; and a driving characteristics determining element for determining driving characteristics of a driver of the vehicle based on the driving information. The driving information includes vehicle speed relating information, which relates to at least one of a vehicle speed, acceleration and deceleration of the vehicle. A driving unit section is defined as a section from the vehicle starts to go until the vehicle stops. The driving characteristics determining element determines the driving characteristics based on the vehicle speed relating information in each driving unit section.

22 Claims, 10 Drawing Sheets

FIG. 12A

| TRA LIT REPETITION \ DRI CHAR | FAST DRIVER | ORDINARY DRIVER | ECO DRIVER |
|---|---|---|---|
| LARGE | LARGE INCREASE | SMALL INCREASE | SMALL INCREASE |
| MEDIUM | SMALL INCREASE | SMALL INCREASE | NO CHANGE |
| SMALL | MEDIUM DECREASE | NO CHANGE | NO CHANGE |

FIG. 12B

| DEGREE OF TRAFFIC \ DRI CHAR | FAST DRIVER | ORDINARY DRIVER | ECO DRIVER |
|---|---|---|---|
| JAMMED | LARGE INCREASE | SMALL INCREASE | SMALL INCREASE |
| CROWDED | MEDIUM INCREASE | SMALL INCREASE | NO CHANGE |
| SMOOTH | MEDIUM DECREASE | NO CHANGE | NO CHANGE |

FIG. 12C

| DIRECTION OF TURN \ DRI CHAR | FAST DRIVER | ORDINARY DRIVER | ECO DRIVER |
|---|---|---|---|
| RIGHT TURN | MEDIUM INCREASE | SMALL INCREASE | NO CHANGE |
| LEFT TURN | SMALL INCREASE | NO CHANGE | NO CHANGE |

FIG. 13
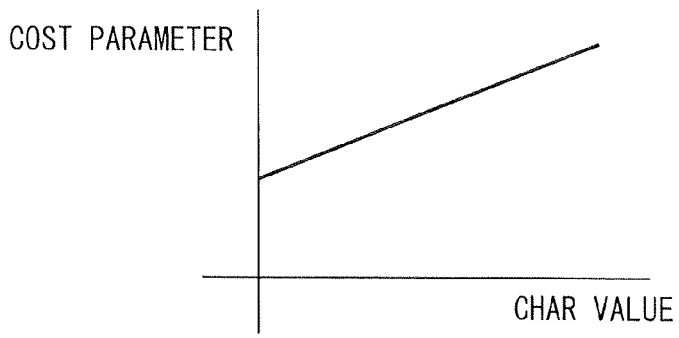
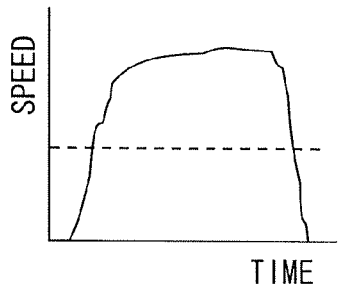
FIG. 14A
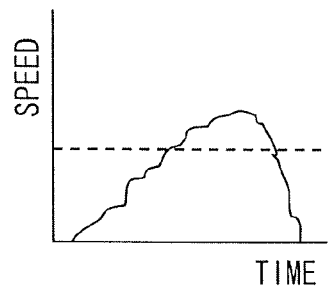
FIG. 14B
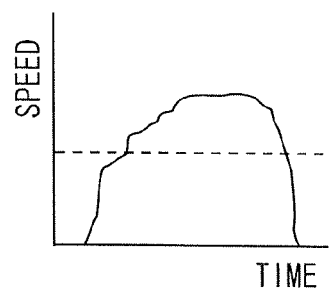
FIG. 14C
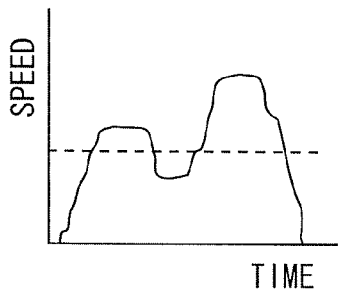
FIG. 14D
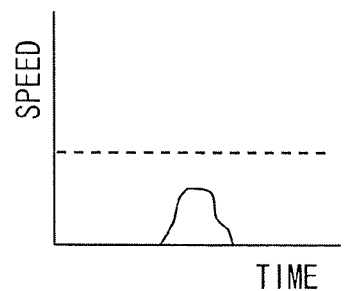
FIG. 14E
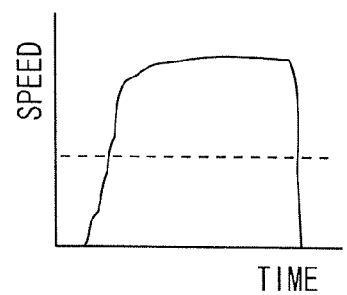
FIG. 14F
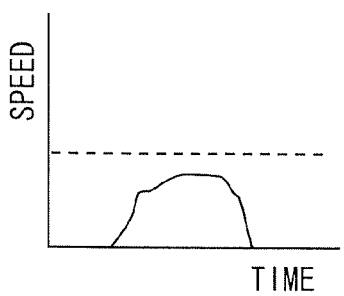
FIG. 14G
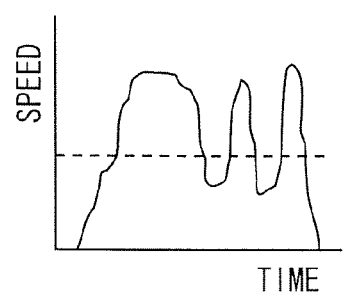
FIG. 14H

DRIVING CHARACTERISTICS DETECTOR AND ROUTE SEARCH DEVICE

CROSS REFERENCE TO RELATED APPLICATION

This application is based on Japanese Patent Application No. 2010-173904 filed on Aug. 2, 2010, the disclosure of which is incorporated herein by reference.

TECHNICAL FIELD

The present invention relates to a driving characteristics detector and a route search device.

BACKGROUND

Conventionally, driving characteristics (i.e., habits) of a driver are detected (i.e., specified), and a route is searched in accordance with the driving characteristics.

For example, JP-A-2008-107155 teaches technique such that driving information is collected in each link according to signals from various sensors such as an acceleration sensor, a brake sensor and a vehicle speed sensor, and the driving characteristics of a driver of the vehicle in an object link is specified based on the driving information. Further, a fuel cost is calculated according to the specified driving characteristics, and the route is searched so as to minimize a total of the fuel cost.

JP-A-2009-31046 teaches technique such that driving condition information and fuel consumption information including vehicle information such as vehicle speed are obtained in unit driving section such as in each 1-kilometer driving section. Multiple past driving condition patterns are preliminary stored, and one of the past driving condition patterns, which has strong correlation with current driving condition information and fuel consumption information, is determined. Then, a fuel consumption distribution data corresponding to the determined past driving condition pattern is updated. Further, the fuel consumption distribution data is utilized for fuel consumption calculation and cost calculation in a route search process.

However, in the above technique, since the driving characteristics are specified according to the driving information in each section having a predetermined distance or each link, the driving characteristics are not specified in each driver with high accuracy.

Specifically, in an individual link or an individual section having the predetermined distance, a factor for limiting traffic of the vehicle such as a temporally stop place and a traffic light may exist in a random manner. The factor for limiting traffic is defined as traffic limitation factor. Thus, the driving information relating to the vehicle speed and vehicle acceleration in the individual link or the individual section may be varied because of the traffic limitation factor. Further, even in the same link or the same section, the traffic limitation factor is changed in accordance with time. For example, the traffic limitation factor depends on a status of the traffic light such as a red signal or a blue signal. Thus, the driving information relating to the vehicle speed and vehicle acceleration in the individual link or the individual section may be varied with time. Accordingly, when the driving characteristics are specified according to the driving information in each link or each section having the predetermined distance, the driving characteristics of each driver are not specified with high accuracy.

SUMMARY

In view of the above-described problem, it is an object of the present disclosure to provide a driving characteristics detector. The driving characteristics detector specifies driving characteristics of a driver of a vehicle with high accuracy. It is another object of the present disclosure to provide a route search device for searching a route according to driving characteristics of the driver of the vehicle.

According to a first aspect of the present disclosure, a driving characteristics detector includes: a driving information obtaining element for obtaining driving information, which relates to a driving condition of a vehicle; and a driving characteristics determining element for determining driving characteristics of a driver of the vehicle based on the driving information. The driving information includes vehicle speed relating information, which relates to at least one of a vehicle speed, acceleration and deceleration of the vehicle. A driving unit section is defined as a section from the vehicle starts to go until the vehicle stops. The driving characteristics determining element determines the driving characteristics based on the vehicle speed relating information in each driving unit section.

In the above detector, the vehicle speed relating information in the driving unit section does not include information during the vehicle stops. Accordingly, when the driving characteristics are determined based on the vehicle speed relating information in each driving unit section, the driving characteristics are determined according to the vehicle speed relating information, which does not include the information in a stoppage time. The stoppage time is generated by the traffic limitation factor such as a stop sign and a traffic light. Accordingly, the driving characteristics are accurately determined without being affected by the traffic limitation factor.

According to a second aspect of the present disclosure, a route search device includes: the driving characteristics detector according to the first aspect of the present disclosure; a map data memory for storing map data, in which a road is presented by a plurality of links and a plurality of nodes; and a route search element for attaching a cost to each link and each node and for searching an optimum route to a destination. A total cost of the links and the nodes in the optimum route is minimum, and the route search element attaches the cost, which corresponds to the driving characteristics of the driver, to each link and each node.

The above device searches the optimum route in accordance with the driving characteristics of the driver.

BRIEF DESCRIPTION OF THE DRAWINGS

The above and other objects, features and advantages of the present invention will become more apparent from the following detailed description made with reference to the accompanying drawings. In the drawings:

FIGS. 12A to 12C are diagrams showing a determination process of a cost parameter in accordance with the driving characteristics;

FIG. 13 is a graph showing a relationship between the cost parameter and a characteristic parameter; and FIGS. 14A to 14H are graphs showing time change of a vehicle speed under various conditions.

DETAILED DESCRIPTION

Figure 1:
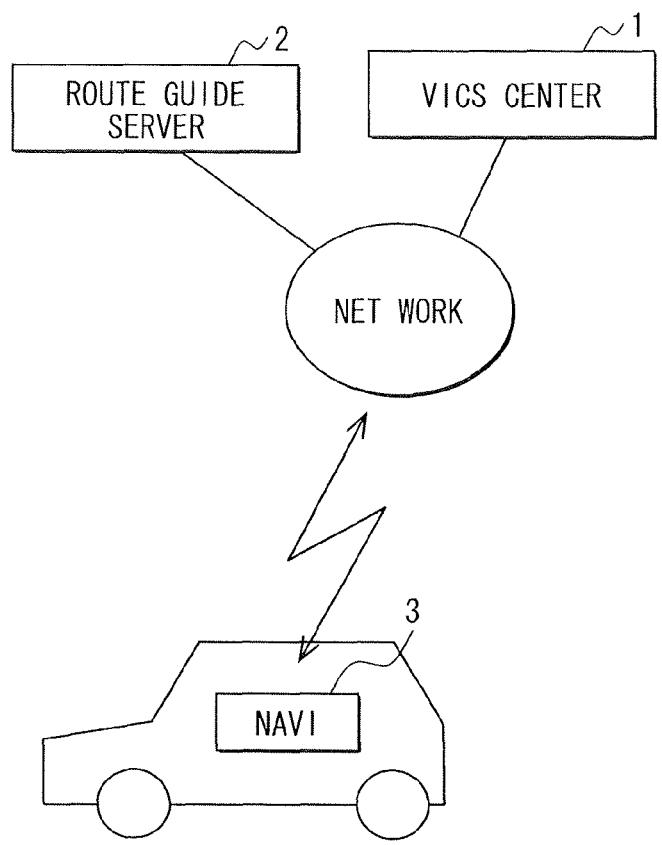
FIG. 1 is a block diagram showing a route guiding system.

FIG. 1 shows a route guidance system 100 according to an example embodiment. The system 100 includes a VICS center 1, a route guidance server 2 and a navigation device 3 mounted on a vehicle. The VICS is a vehicle information and communication system, and a registered trademark. Here, the vehicle, on which the navigation device 3 is mounted, is defined as a subject vehicle. Further, the route guidance system 100 corresponds to a route search device.

The VICS center 1 collects road traffic information from a police station, a road administration office and the like. The road traffic information includes, for example, information about a heavy traffic place, information about a traffic jamming degree, i.e., a traffic volume for showing a degree of a traffic jam, information about section necessary time showing necessary time to pass through a section, information about traffic disturbance such as a road closed caused by traffic accident or a roadwork, information about traffic control such as a lane closed and a temporally traffic regulation. The VICS center 1 distributes the road traffic information via a network and a beacon on a road or a FM station in each district. The VICS center 1 is a conventional VICS center.

The route guidance server 2 searches an optimum route as a recommended route to a destination based on various information such as a current position, the destination and the driver characteristics, which are transmitted from the navigation device 3 via a communication network. Further, the route guidance server 2 transmits a search result, i.e., the optimum guidance route to the navigation device 3. Here, the route guidance server 2 may include one server. Alternatively, the route guidance server 2 may include multiple servers.

Figure 2:
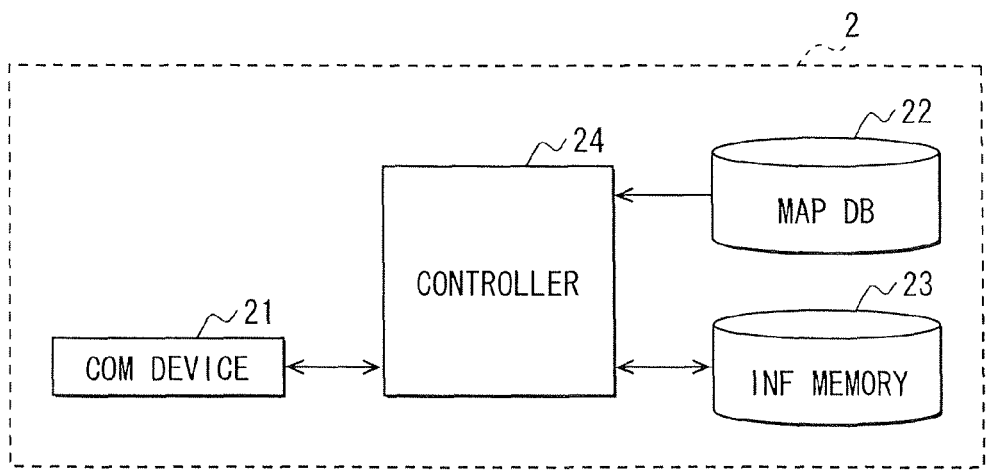
FIG. 2 is a block diagram showing a route searching server.

Here, a construction of the route guidance server 2 will be explained with reference to FIG. 2. FIG. 2 is a block diagram showing the construction of the route guidance server 2. As shown in FIG. 2, the server 2 includes a communication device 21, a map database 22, an information memory 23 and a controller 24.

The communication device 21 communicates with the VICS center 1 and the navigation device 3 via the communication network. For example, the communication device 21 receives information about the current position of the vehicle, the destination and the driver characteristics from the navigation device 3. The communication device 21 transmits the information about the current position of the vehicle, the destination and the driver characteristics to the controller 24. The communication device 21 receives the road traffic information from the VICS center 1. The communication device 21 transmits the road traffic information to the controller 24. Further, the communication device 21 transmits the information about the guidance route from the controller 24 to the navigation device 3.

In the present embodiment, the communication device 21 communicates with the VICS center 1 and the navigation device 3 via the communication network. Alternatively, the communication device 21 may communicate with the VICS center 1 and the navigation device 3 without the communication network.

The map database 22 stores map data. The map data includes at least road data. The road data includes link data and node data showing a road. Here, the link connects between nodes when each road on a map is divided by multiple nodes such as an intersection, a branch and a merge. When the links are connected to each other, the road is formed.

The link data represents a unique number of a link for identifying the link (i.e., a link ID), a link length for showing a length of the link, link shape information, coordinates (i.e., a latitude and a longitude) of a node as a starting point of the link, coordinates (i.e., a latitude and a longitude) of a node as an ending point of the link, the name of the road, the type of the road, the width of the road, the number of lanes of the road, existence of a right turn lane and/or a left turn lane, the number of the right turn lane and the number of the left turn lane, the gradient of the road, the speed limit of the road and the like.

The node data represents a node ID showing a unique number of a node on the map, node coordinates, a node name, a connection link ID showing the link ID connecting to the node, the type of an intersection and the like.

The information memory 23 stores the road traffic information, which is received by the controller 24 from the VICS center 1 via the communication device 21, and the information about the current position, the destination and the driver characteristics, which is received from the navigation device 3.

The controller 24 is a conventional computer, which includes a CPU, a ROM, a RAM, other memories, a I/O element and a bus line. The bus line connects between the CPU, the ROM, the RAM and the other memories. The controller 24 executes a route search process and the like such as a cost determination process and a route search execution process according to various information input from the communication device 21, the map database 22 and the information memory 23. The controller 24 transmits the information about the guidance route obtained in the route search execution process from the communication device 21 to the navigation device 3.

For example, in the cost determination process, the controller 24 determines a link cost and a node cost with using a conventional Dijkstra method as a cost calculation method in accordance with the driving characteristics based on the information about the driving characteristics obtained from the navigation device 3 via the communication device 21. The link cost and the node cost are defined as a cost parameter.

Further, in the route search execution process, the controller 24 searches the optimum route as the recommended route to the destination based on the map data stored in the map database 22 and the information about the current position and the destination obtained from the navigation device 3 via the communication device 21. Further, in the route search execution process, the controller 24 executes the cost calculation with using the cost parameter determined in the cost determination process according to the conventional Dijkstra method so that the recommended route is determined. Here, the cost determination process and the route search execution process in the route guidance server 2 will be explained later.

In the present embodiment, the route guidance server 2 utilizes the VICS center 1 as an information source for the road traffic information. Alternatively, the route guidance server 2 may obtain the road traffic information from an information center other than the VICS center 1 or an in-vehicle terminal mounted on the vehicle as the information source for the road traffic information.

Figure 3:
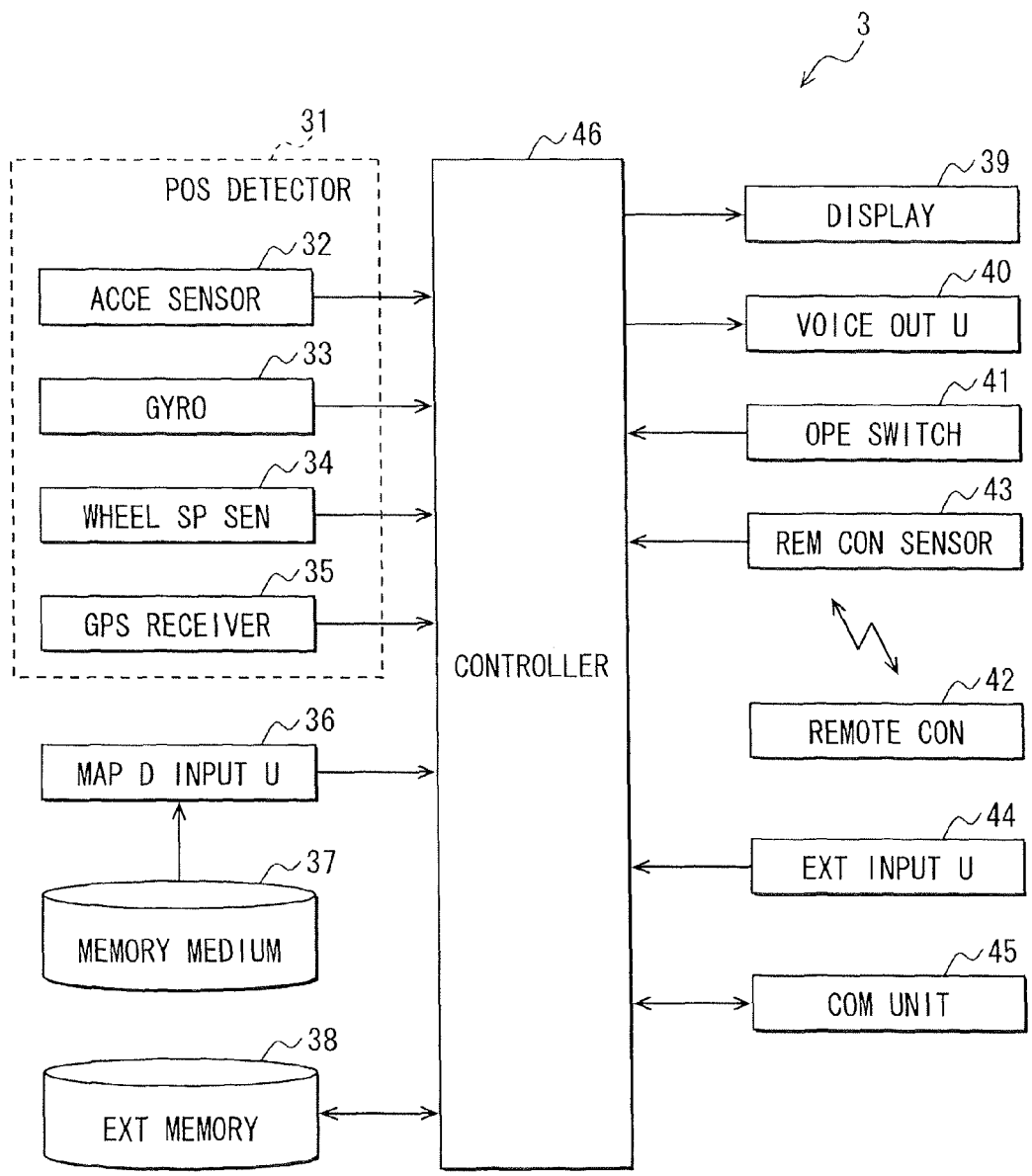
FIG. 3 is a block diagram showing a navigation device.

The navigation device 3 is mounted on the vehicle. The navigation device 3 has a navigation function for executing the route search and the route guidance. Here, the construction of the navigation device 3 will be explained with reference to FIG. 3. FIG. 3 shows the construction of the navigation device 3. The navigation device 3 includes a position detector 31, a map data input unit 36, a memory medium 37, an external memory 38, a display 39, a voice output unit 40, an operations witch 41, a remote control terminal (i.e., a remote controller) 42, a remote control sensor 43, an external input unit 44, a communication unit 45 and a controller 46.

The position detector 31 includes an acceleration sensor for detecting acceleration of the vehicle, a gyroscope 33 for detecting an angular speed of the vehicle around a vertical axis, a wheel speed sensor 34 for detecting a vehicle speed of the vehicle according to a rotation speed of each wheel of the vehicle, and a GPS receiver 35 for detecting the current position of the vehicle according to an electric signal from an artificial satellite and for providing a GPS (i.e., global positioning system). The position detector 31 detects the current position of the vehicle periodically.

The sensors 32-35 have different errors with different properties, respectively. Thus, with using multiple sensors, each error is compensated. Here, in some cases, the position detector 31 may include only a part of the sensors 32-35. Alternatively, the position detector 31 may further include a geomagnetic sensor, a rotation sensor for detecting rotation of a steering wheel, and a vehicle speed sensor.

The memory medium 37 is attached to the map data input unit 36. The map data input unit 36 inputs various data into the controller 46. The various data is stored in the memory medium 37, and includes a map matching data for improving accuracy of a position detection, a map data and a mark data. The memory medium 37 is, for example, a CD-ROM, a DVD-ROM, a memory card or a HDD.

The map data includes the road data, landscape data and character data. For example, the landscape data represents facilities and geographic features on the map and coordinates of the map corresponding to them. The facility data represents a type of each facility, the name of each facility, an address of each facility and the like. The character data provides to display the name of a geographic feature, the name of a facility, the name of a road and the like on the map. The character data represents the name of a geographic feature, the name of a facility, the name of a road and the like on the map and coordinates of a position, at which the name of a geographic feature, the name of a facility, the name of a road or the like is displayed.

The external memory 38 is a mass storage device such as a HDD, which is capable of rewriting data. The external memory 38 stores data, which is necessary not to be deleted even when a power switch turns off, a huge amount of data and the like. Further, the external memory 38 copies and utilizes data from the map data input unit 36 thereto, the data being used frequently. Alternatively, the external memory 38 may be a removable memory having a comparative small memory size.

The display 39 displays the map so as to guide a driving route of the vehicle, a selection screen for selecting a destination and the like. The display 39 displays an image in full color. The display 39 is, for example, a liquid crystal display, an organic EL display, or a plasma display. The voice output unit 40 is, for example, a speaker. Based on an instruction signal from the controller 46, the voice output unit 40 outputs a voice message such as a guidance message when the navigation device 3 guides a route.

The operation switch 41 includes a touch switch and/or a mechanical switch. The touch switch is integrated into the display 39. When a user operates the operation switch 41, various operation instruction signals are input into the controller 46 so that the controller executes various functions such as a map scale changing operation, a destination setting operation, a route searching operation, a route guidance starting operation, a current position correcting operation, a display screen changing operation, and a volume adjusting operation. The operation switch 41 further includes a switch for setting the starting point and the destination. When the user (i.e., a passenger of the vehicle) operates the operations witch 41, the user can set the starting point and the destination based on preliminary registered points, the name of a facility, a telephone number of a facility, and an address of a facility.

The remote controller 42 includes multiple operation switches (not shown). When the user operates switches, and various instruction signals are input into the controller 46 via the remote control sensor 43, the same functions as the operation switch 41 are executed by the controller 46.

The external output unit 44 is an interface for obtaining and inputting driving condition information into the controller 46 from various sensors mounted on the vehicle. The driving condition information such as information about a driving operation of the vehicle, which is defined as driving operation information, and information about behavior of the vehicle, which is defined as vehicle behavior information. The external output unit 44 may obtain the driving condition information via an in-vehicle LAN, which follows a communication protocol such as a CAN (i.e., controller area network) protocol.

The driving operation information includes, for example, information about an on-state or an off state of an operation of an acceleration pedal obtained from an idling switch, information about an opening degree of the acceleration pedal obtained from an acceleration opening degree sensor, information about an opening degree of a throttle valve obtained from a throttle opening degree sensor, information about a revolution speed of an engine obtained from an engine revolution speed sensor, information about an on-state or an off state of an operation of a brake pedal obtained from a brake switch, and information about a braking amount of the brake pedal obtained from a brake stroke sensor. The vehicle behavior information includes, for example, information about acceleration and deceleration of the vehicle obtained from an acceleration sensor and information about a vehicle speed obtained from the wheel speed sensor 34. The driving condition information corresponds to driving information.

The communication unit 45 communicates with the route guidance server 2 via the communication network. Further, the communication unit 45 is coupled with the communication network in a wireless manner. Accordingly, for example, the communication unit 45 may be connected to the network via a wireless communication module. The wireless communication module is an in-vehicle communication module used for telematics communication such as a DCM (i.e., data communication module) mounted on the vehicle, or a cell phone connected to the communication unit 45 and the network in a Bluetooth communication protocol. The name of "Bluetooth" is a registered trademark.

The controller 46 is a conventional computer. The controller 46 includes a CPU, a memory such as a ROM and a RAM, an I/O element and a bus line, which couples between the CPU, the memory and the I/O element. The controller 46 executes a process for a navigation function, a driving characteristics specifying process and the like based on various information input from the position detector 31, the map data input unit 36, the external memory 38, the operation switch 41, the remote control sensor 43, the external input unit 44 and the communication device 45. The process for the navigation function includes, for example, a map scale changing process, a menu screen selecting process, a map matching process, a destination setting process, a route guidance relating process, a current position correcting process, a display screen changing process and a volume control process. The controller 46 corresponds to the driving characteristics specifying device as a driving characteristics detector.

For example, in the driving characteristics specifying process, the controller 46 specifies the driving characteristics of the driver (i.e., driving tendency) based on the driving condition information obtained via the external input unit 44, the information about the current position of the vehicle input from the position detector 31 and the map data input from the map data input unit 36 when the driver drives the vehicle.

Figure 4:
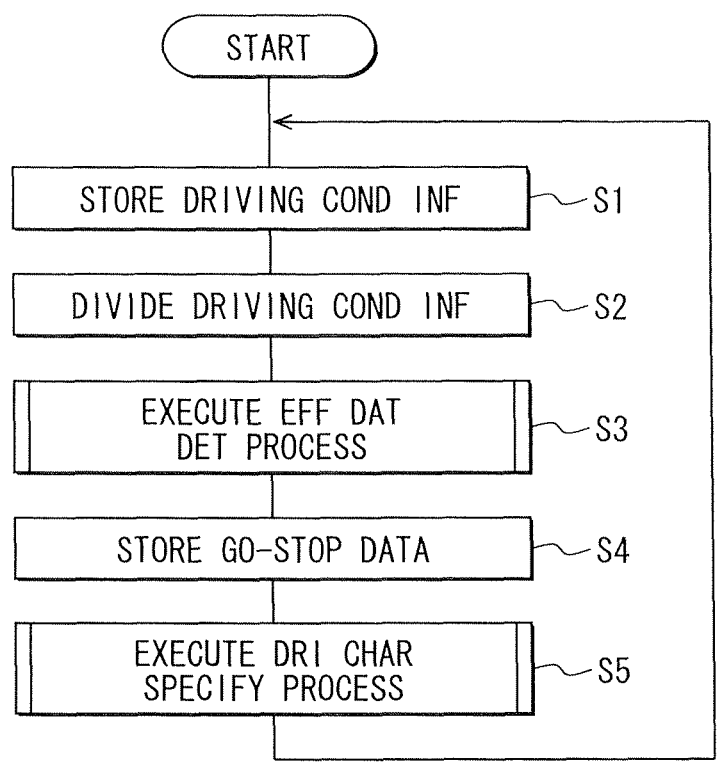
FIG. 4 is a flowchart showing a process of a controller in a navigation device including a driving characteristics specifying process.

Here, a process relating to the driving characteristics specifying process executed by the controller 46 will be explained with reference to FIG. 4. FIG. 4 is a flowchart of the process relating to the driving characteristics specifying process. The controller 46 may start to execute the process relating to the driving characteristics specifying process in FIG. 4 when an ignition switch of the vehicle turns on.

In step S1, the controller 46 stores the driving condition information obtained via the external input unit 44 at a predetermined timing. Then, it goes to step S2. Thus, the controller 46 corresponds to a driving information obtaining unit. The driving condition information obtained by the controller 46 may be stored in a rewritable memory such as a EEPROM and a RAM in the controller 46. Alternatively, the driving condition information may be stored in the external memory 38. Here, the predetermined timing may be set any. For example, the predetermined timing means predetermined time intervals or predetermined distance intervals so that the driving condition information is stored at every predetermined time interval or every predetermined distance interval.

Here, in the present embodiment, the driving condition information includes at least the information about acceleration and deceleration of the vehicle obtained from the acceleration sensor 32 and the information about the vehicle speed obtained from the wheel speed sensor 34. Here, the information about acceleration and deceleration and the information about the vehicle speed correspond to speed relating information.

In step S2, the controller 46 executes a dividing step so that the driving condition information stored in step S1 is divided by every driving section. Then, it goes to step S3. The driving section means a distance between when the vehicle starts to drive and when the vehicle stops driving. The driving section is defined as a go-stop section. The go-stop section is determined according to the information about the vehicle speed obtained from the wheel speed sensor 34, for example. Specifically, the go-stop section is determined as a section from the time the vehicle speed exceeds the detectable limitation of the wheel speed sensor 34 and until the vehicle speed reaches the detectable limitation again.

Figure 5:
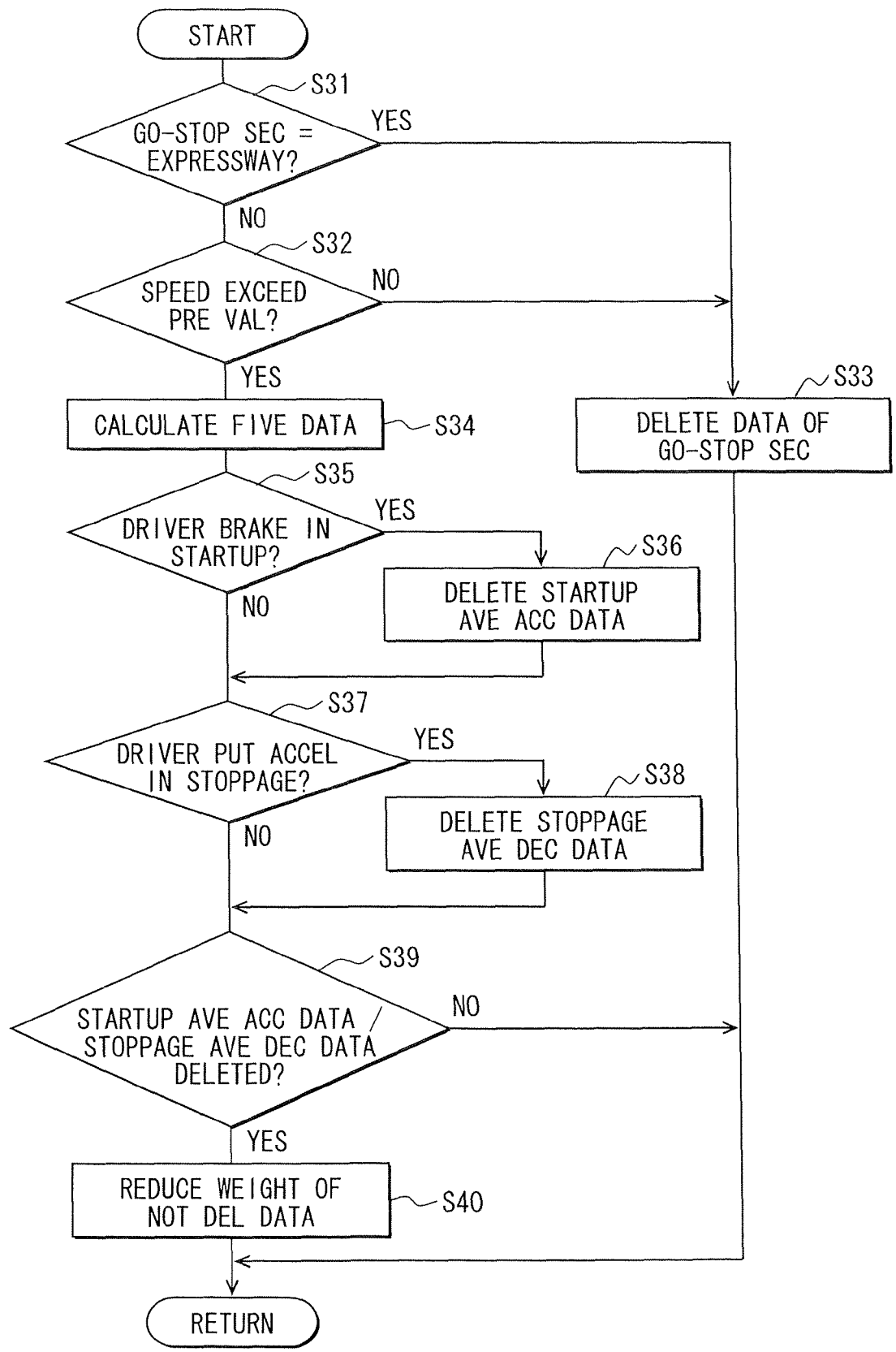
FIG. 5 is a flowchart showing a valid data determination process.

In step S3, the controller 46 executes an effective data determination process, and then, it goes to step S4. The effective data determination process will be explained with reference to FIG. 5. FIG. 5 shows a flowchart of the effective data determination process. The effective data determination process is executed with respect to each go-stop section obtained in step S2.

First, in step S31, the controller 46 determines whether the go-stop section corresponds to an express way. The controller 46 may determine based on the current position information obtained from the position detector 31 and the information about a type of a road in the map data input from the map data input unit 36 whether the go-stop section corresponds to an express way.

When the controller 46 determines that the go-stop section corresponds to the express way, i.e., when the determination in step S31 is "YES," it goes to step S33 since the go-stop section is not suitable for specifying the driving characteristics. When the controller 46 determines that the go-stop section does not correspond to the express way, i.e., when the determination in step S31 is "NO," it goes to step S32.

In step S32, the controller 46 determines based on the vehicle speed information obtained from the wheel speed sensor 34 whether the vehicle speed in the driving condition information in a respective go-stop section exceeds a predetermined value such as, for example, 30 km/h. Here, the predetermined value is a threshold for distinguishing data in a situation such that the driving characteristics of the driver do not appear to the data. For example, when the vehicle flows a leading vehicle having a slow speed, or when the vehicle is stuck in traffic jam, the driving characteristics of the driver do not appear in the data. The predetermined value is set to be any value. In the present embodiment, the predetermined value is set to be 30 km/h.

When the controller 46 determines that the vehicle speed in the driving condition information in the respective go-stop section exceeds the predetermined value, i.e., when the determination is step S32 is "YES," it goes to step S34. When the controller 46 determines that the vehicle speed in the driving condition information in the respective go-stop section does not exceed the predetermined value, i.e., when the determination is step S32 is "NO," it goes to step S33 since the go-stop section is not suitable for specifying the driving characteristics. Thus, the controller 46 provides a second adaptation determination unit. In step S33, the driving condition information in the respective go-stop section is deleted as an unnecessary data. Then, it goes to step S4.

In step S34, based on the information about the vehicle speed obtained from the wheel speed sensor 34 and the information about acceleration and deceleration obtained from the acceleration sensor 32, the controller 46 calculates five data as go-stop data. The five data includes an average acceleration data (i.e., startup average acceleration data) in the driving condition information of the respective go-stop section in a predetermined time interval from the time when the vehicle starts to go, an average deceleration data (i.e., stoppage average deceleration data) in the driving condition information of the respective go-stop section in a predetermined time interval until the vehicle stops going, maximum acceleration data, maximum deceleration data and maximum vehicle speed data. Then, it goes to step S35.

In the present embodiment, the predetermined time interval from the time when the vehicle starts to go is defined as a time interval from the time when the vehicle starts to go until the vehicle speed reaches 30 km/h. The predetermined time interval until the vehicle stops going is defined as a time interval from the time when the vehicle speed drops below 30 km/h until the vehicle stops without exceeding 30 km/h.

In step S35, the controller 46 determines whether the driver puts the brake pedal in the predetermined time interval from the time when the vehicle starts to go. The controller 46 determines whether the driver puts the brake pedal, based on the information about the on-state and the off-state of operation of the brake pedal obtained from a brake switch in the driving condition information in the respective go-stop section.

When the controller 46 determines that the driver puts the brake pedal in the predetermined time interval from the time when the vehicle starts to go (i.e., in the predetermined startup period), i.e., when the determination of step S35 is "YES," it goes to step S36 since the acceleration according to the driving characteristics of the driver is not performed. In this case, for example, since a leading vehicle having a slow speed interrupts the vehicle just after the vehicle starts to drive, the driving characteristics of the driver do not appear, and therefore, the data is not suitable for specifying the driving characteristics. When the controller 46 determines that the driver does not put the brake pedal in the predetermined time interval from the time when the vehicle starts to go, i.e., when the determination of step S35 is "NO," it goes to step S37. In step S36, the startup average acceleration data in the go-stop data of the respective go-stop section is deleted, and then, it goes to step S37.

In step S37, the controller 46 determines whether the driver puts the acceleration pedal in the predetermined time interval until the vehicle stops. The controller 46 determines whether the driver puts the acceleration pedal, based on the information about the on-state and the off-state of operation of the acceleration pedal obtained from a idling switch in the driving condition information in the respective go-stop section.

When the controller 46 determines that the driver puts the acceleration pedal in the predetermined time interval until the vehicle stops (i.e., in the predetermined stoppage period), i.e., when the determination of step S37 is "YES," it goes to step S38 since the deceleration according to the driving characteristics of the driver is not performed. In this case, for example, since the vehicle follows a leading vehicle just before the vehicle stops, the driving characteristics of the driver do not appear, and therefore, the data is not suitable for specifying the driving characteristics. When the controller 46 determines that the driver does not put the acceleration pedal in the predetermined time interval until the vehicle stops, i.e., when the determination of step S37 is "NO," it goes to step S39. In step S38, the stoppage average deceleration data in the go-stop data of the respective go-stop section is deleted, and then, it goes to step S39. The controller 46 corresponds to a first adaptation determination unit.

In step S39, when the startup average acceleration data and/or the stoppage average deceleration data are deleted, i.e., when the determination of step S39 is "YES," it goes to step S40. When both of the startup average acceleration data and the stoppage average deceleration data are not deleted, i.e., when the determination of step S39 is "NO," it goes to step S4.

In step S40, a weight of the go-stop data (i.e., not deleted go-stop data) in the respective go-stop section at a later-described learning step is reduced, and then, it goes to step S4. Here, the go-stop data includes the maximum acceleration data, the maximum deceleration data and the maximum vehicle speed data, which are not deleted.

In step S4 of FIG. 4, each go-stop data processed in the effective data determination process in step S3 is stored, and then, it goes to step S5. Each go-stop data processed in the effective data determination process in step S3 may be stored in a rewritable memory such as a EEPROM and a RAM of the controller 46. Further, when the amount of the stored go-stop data is equal to or larger than a predetermined amount, the old data may be deleted chronologically.

When multiple users utilize the same vehicle as a driver, one of the users can be identified as a driver of the vehicle with using the operation switch 41 and/ort the remote controller 42. Further, each user is specified by an identification number (e.g., a user ID), and the go-stop data may be connected to the user ID, so that the go-stop data is managed by each user. In this case, based on the go-stop data in each user, the driving characteristics of each user are specified.

Figure 6:
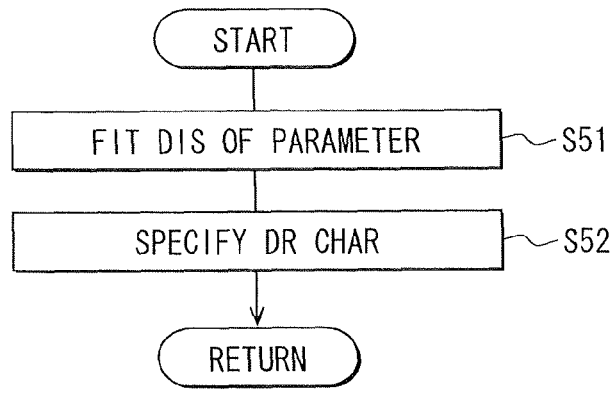
FIG. 6 is a flowchart showing a driving characteristics specifying process.
Figure 7:
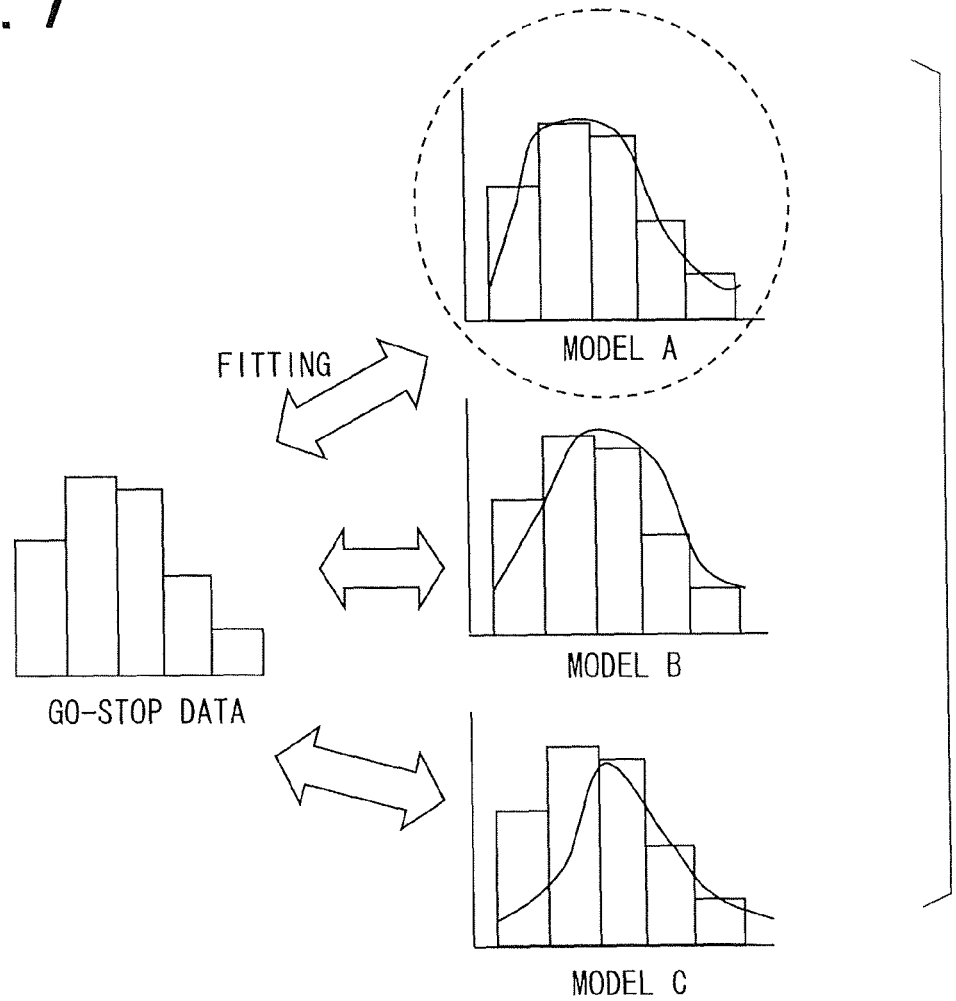
FIG. 7 is a diagram showing a fitting step.

In step S5, the driving characteristics specifying process is executed, and then, it returns to step S1. The process in FIG. 4 is repeatedly performed. Here, the driving characteristics specifying process will be explained with reference to FIGS. 6 and 7. FIG. 6 shows a flowchart of the driving characteristics specifying process. FIG. 7 shows a fitting step.

In step S51, the controller 46 executes a fitting process for fitting a distribution of each parameter of the go-stop data to one of three characteristic models. Here, the parameters in the go-stop data correspond to the startup average acceleration data, the stoppage average deceleration data, the maximum acceleration data, the maximum deceleration data and the maximum vehicle speed data. Further, when the startup average acceleration data and/or the stoppage average deceleration data are deleted in step S3, the parameters correspond to the residual not-deleted go-stop data.

Here, three characteristic models include a model A, which represents a fast driver, a model B, which represents a normal driver, and a model C, which represents an eco driver. In the model A, the vehicle speed and the acceleration are large. In the model C, the vehicle speed and the acceleration are small. In the model B, the vehicle speed and the acceleration are disposed in the middle between the model A and the model C.

The startup average acceleration data, the stoppage average deceleration data, the maximum acceleration data, the maximum deceleration data and the maximum vehicle speed data are preliminary set in each characteristic model such that the driving tendency of the driver corresponding to the model is reflected on the startup average acceleration data, the stoppage average deceleration data, the maximum acceleration data, the maximum deceleration data and the maximum vehicle speed data. Here, each parameter of the characteristic model is preliminary determined by an actual measurement value and/or a simulation result of the driver corresponding to the characteristic model. The model A corresponds to the fast driver pattern, the model B corresponds to the normal driver pattern, and the model C corresponds to the eco driver pattern.

In step S52, as a result of fitting the go-stop data to one of the three patterns, the characteristic model having the minimum difference with the parameter of the go-stop data is selected. The selected model pattern is defined as the driving characteristics of the driver. In the fitting process, for example, a different between each parameter of the go-stop data and a corresponding parameter of one of the characteristic models is calculated. When the total of the absolute value of the difference of all parameters in the one of the characteristic models is the smallest, the one of the characteristic models is defined as the smallest difference characteristic model.

For example, in FIG. 7, the distribution of each parameter of the go-stop data coincides with the model A representing the fast driver pattern. Thus, the fitting difference between the model A and the go-stop data is minimum. Accordingly, as the model A is surrounded with a dotted circle, the model A is selected, so that the driving characteristics of the driver are specified as the fast driver pattern.

When a part of the go-stop data is deleted in step S3, the differences between the residual parameters of the go-stop data and corresponding parameters of the characteristic model are calculated. When the total of the absolute values of the differences in a certain characteristic model is minimum, the certain characteristic model is selected as the smallest difference characteristic model.

Further, in step S51, the fitting process is performed in each go-stop data, which is stored. The specified driving characteristics of the driver in each go-stop data are evaluated (i.e., studied or investigated) so that the driving characteristics of the driver is finally determined. For example, when all of the differences of five parameters between the go-stop data and the characteristic model are minimum, the largest weight is attached to the go-stop data, i.e., the characteristic model. When the differences of four parameters between the go-stop data and the characteristic model are minimum, the second largest weight is attached to the go-stop data, i.e., the characteristic model. When the differences of only three parameters between the go-stop data and the characteristic model are minimum, the smallest weight is attached to the go-stop data, i.e., the characteristic model.

The characteristic models specified according to all go-stop data are evaluated. Then, when weighting points of one of the characteristic models are the largest, the one of the characteristic models is determined finally as the characteristic model of the driver. Specifically, when the number of times for specifying one of the characteristic models as the largest weight is the maximum, the one of the characteristic models is determined finally as the characteristic model of the driver. Then, it returns to step S1. Thus, the controller 46 corresponds to the driving characteristic specifying unit. The process of the controller 46 in the navigation device 3 including the driving characteristics specifying process in FIG. 4 may end when the ignition switch of the vehicle turns off.

The finally determined driving characteristics of the driver is stored in the rewritable memory such as the EEPROM and the RAM in the controller 46 or the external memory 38. Further, in the present embodiment, the information of the finally determined driving characteristics of the driver determined the driving characteristic specifying process is stored in the external memory 38. When multiple users utilizes the same vehicle as the driver, each driver is identified by identification information such as a user ID, and the finally determined driving characteristics are connected to the identification information, so that the information about the finally determined driving characteristics together with corresponding identification information are stored in the memory 38.

In the present embodiment, the five parameters of the startup average acceleration, the stoppage average deceleration, the maximum acceleration, the maximum deceleration and the maximum vehicle speed are utilized for determining the driving characteristics of the driver. Alternatively, for example, at least one of the information about the vehicle speed such as the maximum vehicle speed, the information about the acceleration such as the startup average acceleration and the maximum acceleration, and information about the deceleration such as the stoppage average deceleration and the maximum deceleration may be utilized for determining the driving characteristics of the driver.

Here, when at least one of the information about the acceleration, the information about the deceleration and the information about the vehicle speed is utilized for determining the driving characteristics of the driver, it is preferable to utilize the information about the acceleration. The information about the acceleration remarkably presents the characteristics of the driver. Thus, when the driving characteristics of the driver are determined based on the information about the acceleration, the driving characteristics of the driver are determined with high accuracy.

Figure 8A:
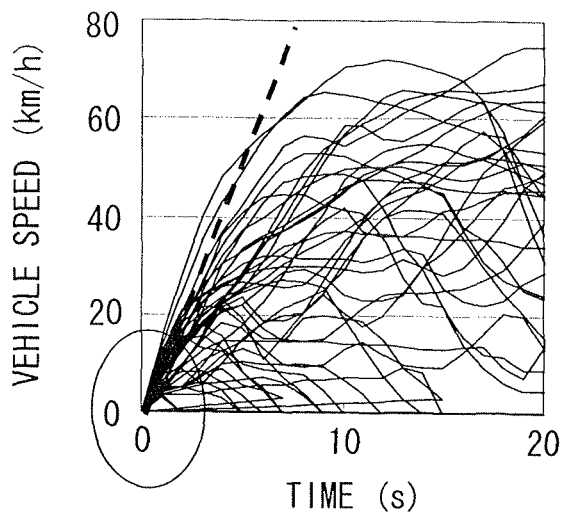
FIGS. 8A to 8C are graphs showing time change of an actual vehicle speed.
Figure 8B:
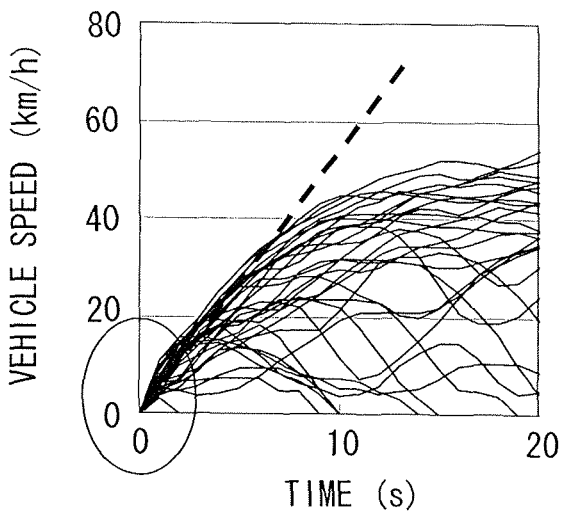
Figure 8C:
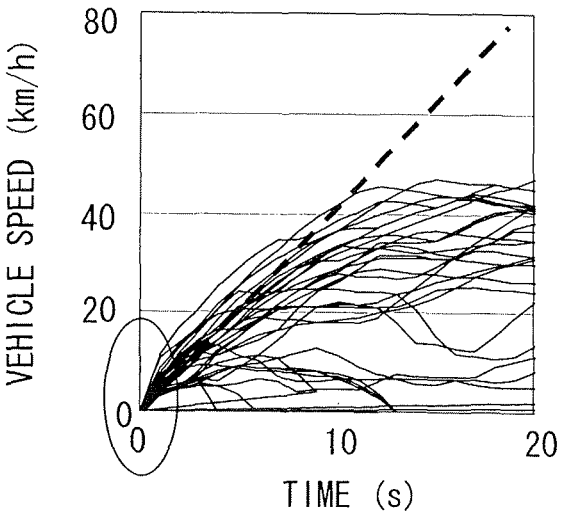

Here, the reason why the information about the acceleration remarkably presents the characteristics of the driver will be explained with reference to FIGS. 8A to 8C. FIGS. 8A to 8C show time variances of the actual measurement values of the vehicle speed in each driver. FIG. 8A corresponds to the actual measurement values of the fast driver. FIG. 8B corresponds to the actual measurement values of the ordinary driver. FIG. 8C corresponds to the actual measurement values of the eco driver. The dotted line in each of FIGS. 8A to 8C represents the startup average acceleration. As shown in FIGS. 8A to 8C, the startup average acceleration of the fast driver pattern, the ordinary driver pattern and the eco driver pattern are different from each other. Thus, the information about the acceleration of the vehicle remarkably presents the characteristics of the driver.

Here, in addition to the information of the vehicle speed and the information of the acceleration of the vehicle, a ratio between usage of a foot brake and usage of an engine brake and the like may be utilized for determining the characteristics of the driver. For example, when the ratio of the usage of the engine brake is high, the characteristics of the driver present the eco driver pattern.

In the route guidance relating process, the controller 46 transmits various information such as the information about the driving characteristics of the driver specified in the driving characteristic specifying process, the information about the current position of the vehicle input from the position detector 31, the information about the destination and the like input via the remote control sensor 43 and the operation switch 41 to the route guidance server 2 via the communication unit 45. The controller 46 requests the route guidance server 2 to search the route. Based on various information, the information about the guidance route obtained in the route searching process in the route guidance server 2 is received by the controller 46 via the communication unit 45. Here, the information about the guidance route is defined as the route information. According to the route information, the controller 46 starts to guide the route.

Figure 9:
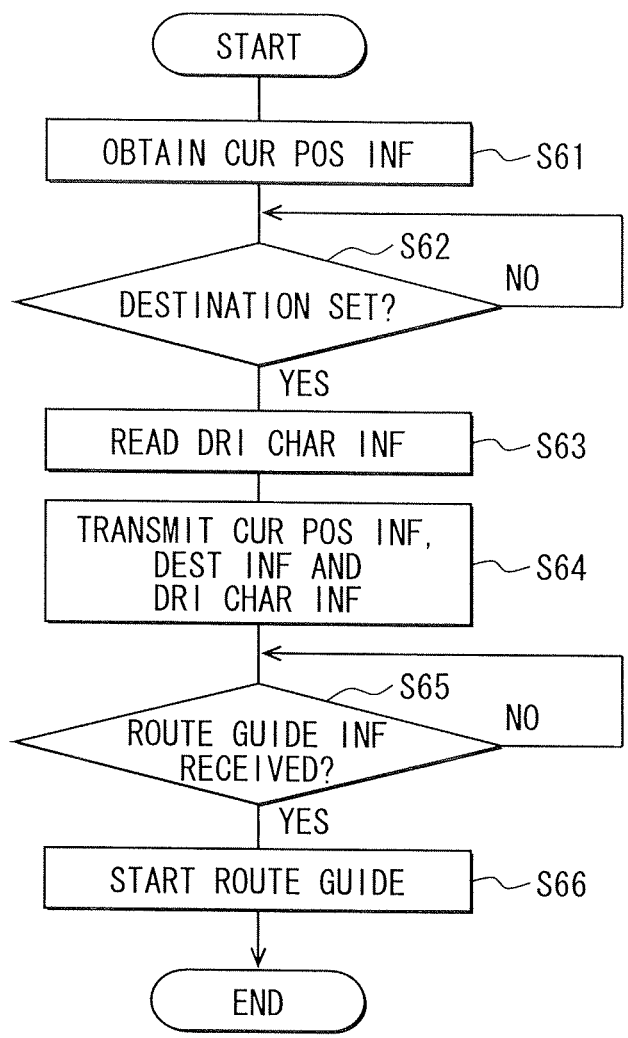
FIG. 9 is a flowchart showing a route guidance relating process of the controller in the navigation device.

Here, the route guidance relating process in the controller 46 will be explained with reference to FIG. 9. FIG. 9 is a flowchart of the route guidance relating process in the controller 46. The controller 46 starts to execute the route guidance relating process in FIG. 9 when the controller 46 receives an operation input signal for requesting to start the route guidance process, which is input by the driver via the operation switch 41 and/or the remote controller 42.

In step S61, the information about the current position of the vehicle input from the position detector 31 is obtained. Then, it goes to step S62. In step S62, the controller 46 determines whether the destination has been set. The determination whether the destination has been set is performed according to the fact that the information about the destination is input via the operation switch 41 and the remote control sensor 43. When the controller 46 determines that the destination has been set, i.e., when the determination of step S62 is "YES," it goes to step S63. When the controller 46 determines that the destination has not been set yet, i.e., when the determination of step S62 is "NO," it returns to step S61 so that the process in FIG. 9 is repeated. When the controller 46 determines that the destination has not been set yet, a message for prompting the user to set the destination may be displayed on the display 39. Alternatively, when the controller 46 determines that the destination has not been set yet, a voice message for prompting the user to set the destination may be output from the voice output unit 40. Thus, the controller 46 requests the user to input the destination.

In step S63, the controller 46 reads out the information about the driving characteristics of the driver, which is specified in the driving characteristic specifying process, from the external memory 38. Then, it goes to step S64. Here, when multiple users utilize the same vehicle as a driver, and the information about the driving characteristics of the driver together with the corresponding user ID for specifying each driver are stored in the external memory 38, the controller 46 reads the information about the driving characteristics of the driver according to the user ID.

In step S64, the controller 46 transmits the information about the current position, the information about the destination and the information about the driving characteristics to the route guidance server 2 via the communication unit 45. Then, it goes to step S65. In step S65, when the controller 46 receives the route guidance information from the route guidance server 2, i.e., when the determination of step S65 is "YES," it goes to step S66. When the controller 46 does not receive the route guidance information from the route guidance server 2, i.e., when the determination of step S65 is "NO," it goes to step S65. Thus, step S65 is repeated. In step S66, the controller 46 starts the route guidance according to the route guidance information received from the route guidance server 2. Thus, the process in FIG. 9 ends.

Figure 10:
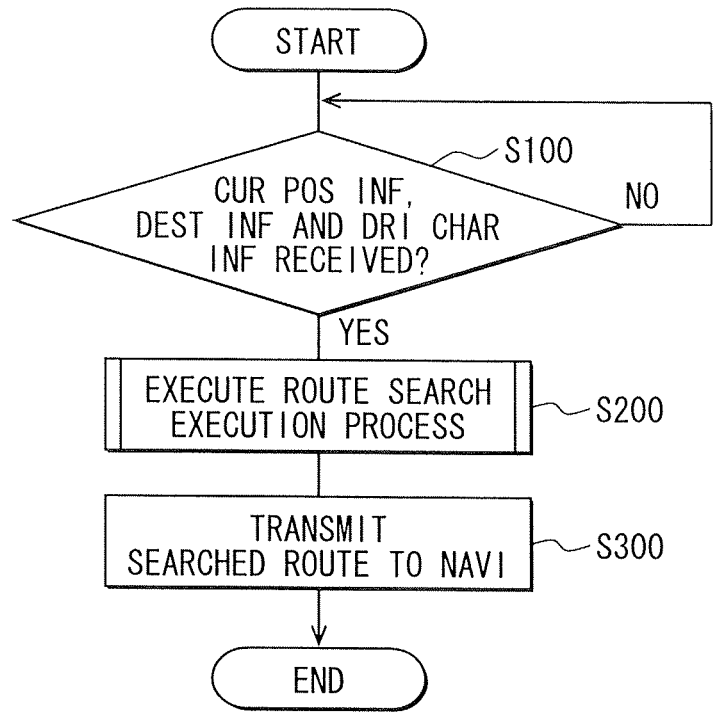
FIG. 10 is a flowchart showing a route search relating process in a controller in a route search server.

The route searching relating process in the controller 24 of the route guidance server 2 will be explained with reference to FIG. 10. FIG. 10 is a flowchart of the route searching relating process in the controller 24. The controller 24 starts to execute the route searching relating process in FIG. 10 when the communication between the route guidance server 2 and the navigation device 3 is established.

In step S100, when the route guidance server 2 receives the information about the current position, the information about the destination and the information about the driving characteristics of the driver from the navigation device 3, i.e., when the determination of step S100 is "YES," it goes to step S200. When the route guidance server 2 does not receive the information about the current position, the information about the destination and the information about the driving characteristics of the driver from the navigation device 3, i.e., when the determination of step S100 is "NO," it returns to step S100. Then, step S100 is repeated.

Figure 11:
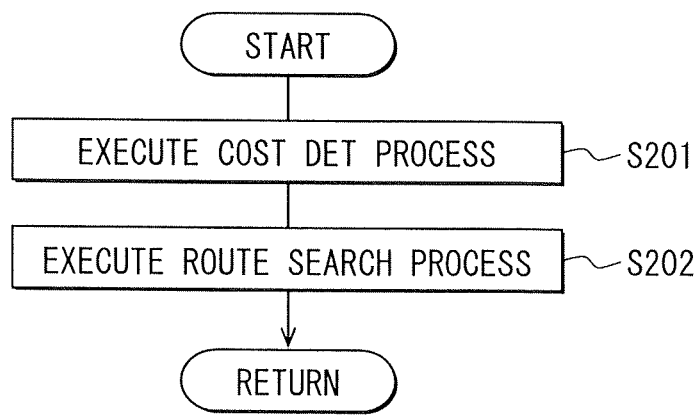
FIG. 11 is a flowchart showing a route search process.

In step S200, the route searching process is executed. Then, it goes to step S300. Here, the route searching process is explained with reference to FIG. 11. FIG. 11 is a flowchart of the route searching process.

In step S201, a cost determination process is executed. Then, it goes to step S202. In the cost determination process, the controller 24 determines a cost parameter based on the information about the driving characteristics obtained from the navigation device 3, the map data stored in the map database 22 and the information about a place of a traffic jam and a degree of the traffic jam received from the VICS center 1. Thus, the controller 24 corresponds to the traffic jam information obtaining unit.

The cost determination process for determining the cost parameter in accordance with the driving characteristics will be explained with reference to FIG. 12A to 12C. FIG. 12A shows various link cost (i.e., the cost parameter) in accordance with the driving characteristics and the repetition of the traffic signals, i.e., the number of traffic lights. FIG. 12B shows the cost parameter in accordance with the driving characteristics and the degree of traffic jam. FIG. 12C shows the cost parameter in accordance with the driving characteristics and the direction of turn. In the cost determination process, the cost parameter is determined in view of the consumption efficiency of driving energy such as fuel consumption and electric power consumption according to the driving characteristics of the driver. In FIGS. 12A to 12C, the cost parameter is determined in view of the consumption efficiency of driving energy.

For example, as shown in FIG. 12A, when the driving characteristics are defined as the fast driver character, and the number of the traffic lights (i.e., the traffic light repetition) is large, the link cost increases large. When the driving characteristics are defined as the fast driver character, and the number of the traffic lights is medium, the link cost increases small. When the driving characteristics are defined as the fast driver character, and the number of the traffic lights is small, the link cost decreases medium. Here, although the changing amount of the link cost is defined by large, medium and small, the changing amount is relative amount. Specifically, the changing amount may be set to any. The increase and the decrease of the cost parameter are based on a standard value. Thus, for example, when the cost parameter largely increases, the cost parameter increases from the standard value by a predetermined large amount.

Further, when the driving characteristics are defined as the ordinary driver character, and the number of the traffic signals is large or medium, the link cost increases small. When the driving characteristics are defined as the ordinary driver character, and the number of the traffic signals is small, the link cost does not change, i.e., the link cost remains to be the standard value. When the driving characteristics are defined as the eco driver character, and the number of the traffic signals is large, the link cost increases small. When the driving characteristics are defined as the eco driver character, and the number of the traffic signals is medium or small, the link cost does not change, i.e., the link cost remains to be the standard value.

As shown in FIG. 12B, when the driving characteristics are defined as the fast driver character, and the traffic jam degree (i.e., the degree of traffic jam) is defined as jammed, the link cost increases large. When the driving characteristics are defined as the fast driver character, and the traffic jam degree is defined as crowded, the link cost increases medium. When the driving characteristics are defined as the fast driver character, and the traffic jam degree is defined as smooth, the link cost decreases medium. Here, the traffic jam degree is determined by evaluation standard of the traffic jam degree of the VICS center 1.

When the driving characteristics are defined as the ordinary driver character, and the traffic jam degree is defined as jammed or crowded, the link cost increases small. When the driving characteristics are defined as the ordinary driver character, and the traffic jam degree is defined as smooth, the link cost remains to be the standard value. When the driving characteristics are defined as the eco driver character, and the traffic jam degree is defined as jammed or crowded, the link cost increases small. When the driving characteristics are defined as the eco driver character, and the traffic jam degree is defined as crowded or smooth, the link cost remains to be the standard value.

As shown in FIG. 12C, when the driving characteristics are defined as the fast driver character, and the direction of turn at an intersection as the node is right turn, the node cost as the cost parameter increases medium. When the driving characteristics are defined as the fast driver character, and the direction of turn at an intersection as the node is left turn, the node cost increases small. When the driving characteristics are defined as the ordinary driver character, and the direction of turn at an intersection as the node is right turn, the node cost increases small. When the driving characteristics are defined as the ordinary driver character, and the direction of turn at an intersection as the node is left turn, the node cost remains to be the standard value. When the driving characteristics are defined as the eco driver character, and the direction of turn at an intersection as the node is right or left turn, the node cost remains to be the standard value. Here, in FIG. 12C, the driver drives the vehicle on the left side. Accordingly, when the driver drives the vehicle on the right side, the direction of turn in FIG. 12C is switched between the right turn to the left turn.

In the present embodiment, when the driving characteristics are defined as the fast driver character, the link cost of the link in which the number of the traffic signals is large, the link cost of the link which includes a traffic jam place, and the node cost of the node, at which the vehicle turns right or left, increase. Alternatively, when the driving characteristics are defined as the fast driver character, the node cost of the node, at which the vehicle is need to stop temporally, and the link cost of the link, which includes a stop sign, may increase. Here, the node including the stop sign and the link including the stop sign may be determined according to the map data stored in the map database 22.

In the present embodiment, the driving characteristics are classified to three patterns of the fast driver pattern, the ordinary driver pattern and the eco driver pattern. Alternatively, the driving characteristics may be classified to two patterns. Further, the driving characteristics may be classified to four or more patterns.

When the driving characteristics are classified to four or more patterns, for example, the driving characteristics may be classified by the parameter of the information about the vehicle speed, the acceleration and the deceleration such as "the startup average acceleration is XX," "the stoppage average deceleration is YY," and "the maximum vehicle speed is ZZ." In this case, for example, the average of the parameter of the information about the vehicle speed, the acceleration and the deceleration in each go-stop data is defined as a characteristic value, and the characteristics value is used as the information of the driving characteristics of the driver.

When the characteristics value is used as the information of the driving characteristics of the driver, the cost parameter corresponding to the characteristic value may be determined in the cost determination process according to a linear function shown in FIG. 13. Here, FIG. 13 is a graph showing a relationship between the cost parameter and the characteristic value.

In step S202 in FIG. 11, the route search execution process is performed according to the cost parameter determined in the cost determination process. Then, it goes to step S300. In the route search execution process, an optimum route is searched such that the optimum route satisfies a search condition. The search condition is preliminary set such that a distance is prioritized, time is prioritized, a driving energy consumption efficiency is prioritized, or the like. A method for searching the optimum route automatically is performed by an evaluation value calculation method with using the cost parameter, i.e., a cost calculation method with the conventional Dijkstra method. Here, the cost parameter represents, for example, the link cost and the node cost. The cost calculation in the present embodiment will be explained as follows.

Here, in the present embodiment, under the search condition that the driving energy consumption efficiency is prioritized, the optimum route is searched with using the cost parameter in view of the driving energy consumption efficiency. Further, in the present embodiment, the position represented by the information about the current position of the vehicle received from the navigation device 3 is set to the starting point. Alternatively, the user may input the starting point via the operation switch 41 and/or the remote controller 42 in the navigation device 3. In this case, the navigation device 3 transmits the information about the input point as the starting point instead of the information about the current position to the route guidance server 2.

First, the link data and the node data or covering an area from the starting point to the destination is read out from the map database 22. Then, the link data and the node data are stored in the memory such as the RAM of the controller 34. With using the stored link data and the stored node data, the route is searched such that the total of the link cost and the node cost from the starting point to the destination in the route is minimum. Here, the map database 22 corresponds to the map data storage, and the controller 24 corresponds to the route searching unit.

Specifically, in the route search execution process, the cost parameter is multiplied by the link data and the node data from the starting point to the destination, and the route is searches such that the accumulated value from the starting point to the destination is minimum. In this case, when the cost parameter determined according to the driving characteristics in the cost determination process is used, the optimum route is set in accordance with the driving characteristics.

For example, as shown in FIGS. 12A to 12C, when the driving characteristics are defined as the fast driver character, the link cost of the link in which the number of the traffic signals is large, the link cost of the link which includes a traffic jam place, and the node cost of the node, at which the vehicle turns right or left, increase. Thus, the optimum route is searched such that the number of stops is minimized, and the number of traffic jam places through which the vehicle runs is minimized. Thus, the stress of the driver who is classified as the fast driver pattern of the driving characteristics is reduced.

In step S300 in FIG. 10, the information (i.e., the route information) about the searched route obtained in the route search process is transmitted to the navigation device 3 via the communication unit 21. Then, the process in FIG. 10 ends.

Thus, the driving characteristics of the driver is determined according to the go-stop data such as the startup average acceleration data, the stoppage deceleration data, the maximum acceleration data, the maximum deceleration data and the maximum vehicle speed in each of the go-stop sections, which is defined as a section from the vehicle starts till the vehicle stops. Thus, the driving characteristics of the driver are determined according to the information, in which the information affected by the factor for limiting traffic of the vehicle such as a temporally stop place and a traffic light and corresponding to the stoppage time is eliminated. Thus, without being affected by the factor for limiting traffic, the driving characteristics of the driver are specified with high accuracy.

In the above construction, in the effective data determination process, all of the go-stop data in the go-stop section, which is not suitable for determining the driving characteristics, are not used for determining the driving characteristics. Alternatively, in the effective data determination process, a part of the go-stop data in the go-stop section, which is not suitable for determining the driving characteristics, may not be used for determining the driving characteristics. Thus, the driving characteristics of the driver are determined by the go-stop data other than a part of the go-stop data, to which the driving characteristics of the driver do not appear. The driving characteristics of the driver are specified with high accuracy.

The effects of the above feature will be explained with reference to FIGS. 14A to 14H. FIGS. 14A to 14H show speed change of the vehicle under various driving conditions. The vertical axis of each of FIGS. 14A to 14H shows the vehicle speed of the vehicle, and the horizontal axis represents time. A broken line in FIGS. 14A to 14H represents a predetermined speed such as 30 km/h.

FIG. 14A shows the relationship between the vehicle speed and time in a case where the driver drives the vehicle according to the driving characteristics of the driver since there is no leading vehicle in front of the vehicle. FIG. 14A represents a normal type graph. FIG. 14B shows the relationship between the vehicle speed and time in a case where the driver drives the vehicle when a leading vehicle in front of the vehicle runs with slow acceleration. FIG. 14B represents a first following type graph. FIG. 14C shows the relationship between the vehicle speed and time in a case where the driver drives the vehicle when a leading vehicle in front of the vehicle runs with slow acceleration, and the leading vehicle blocks the path of the vehicle while the vehicle accelerates. FIG. 14C represents a second following type graph. FIG. 14D shows the relationship between the vehicle speed and time in a case where the driver decelerates the vehicle temporally before an intersection. FIG. 14D represents a twin-peak type graph. FIG. 14E shows the relationship between the vehicle speed and time in a case where the vehicle is caught in a traffic jam. FIG. 14E represents a traffic jam type graph. FIG. 14F shows the relationship between the vehicle speed and time in a case where the driver screeches to a stop since the leading vehicle in front of the vehicle screeches to a stop. FIG. 14F represents a sudden braking type graph. FIG. 14G shows the relationship between the vehicle speed and time in a case where the vehicle stops accelerating in the middle since a traffic light turns to a red signal. FIG. 14G represents a mid stop type graph. FIG. 14H shows the relationship between the vehicle speed and time in a case where the vehicle almost stops many times but does not stop. FIG. 14H represents a zig-zag type graph.

For example, in the above effective data determination process, when the controller 46 determines that the vehicle speed in the go-stop section does not exceed 30 km/h, since the go-stop data in the go-stop section is not suitable for determining the driving characteristics, and therefore, all of the go-stop data is not used for determining the driving characteristics. In this case, the go-stop data of the go-stop section corresponding to the traffic jam type graph in FIG. 14E and the mid stop type graph in FIG. 14G, in which the vehicle speed does not exceed 30 km/h, is not used for determining the driving characteristics. Thus, since the go-stop data in a situation such that the driving characteristics of the driver do not appear to the data is removed, the driving characteristics of the driver are determined with high accuracy.

Further, in the above effective data determination process, when the controller 46 determines that the driver puts on the brake in a startup period of the go-stop section, the controller 46 determines that the go-stop data of the go-stop section is not suitable for determining the driver characteristics. Thus, in this case, the startup average acceleration data in the go-stop data of the go-stop section is not used for determining the driver characteristics.

Thus, regarding the go-stop data of the go-stop section corresponding to the first and second following type graphs in FIGS. 14B and 14C, in which the acceleration is largely reduced since the driver puts on the brake before the vehicle speed exceeds 30 km/h, the startup average acceleration in the data is not used for determining the driver characteristics. Thus, since the startup average acceleration in the go-stop data in a situation such that the driving characteristics of the driver do not appear to the data is removed, the driving characteristics of the driver are determined with high accuracy. Here, the information such that the driver puts on the brake before the vehicle speed reaches 30 km/h corresponds to operation information. The startup average acceleration corresponds to speed related information.

In the above effective data determination process, when the controller 46 determines that the driver puts on the acceleration pedal in the stoppage period of the go-stop section, the controller 46 determines that the go-stop data of the go-stop section is not suitable for determining the driver characteristics. In this case, the stoppage average deceleration data in the go-stop data of the go-stop section is not used for determining the driver characteristics.

Thus, the first following type graph in FIG. 14B, in which the vehicle speed does not exceed 30 km/h, and the driver puts on the acceleration pedal before the vehicle stops after the vehicle speed falls below 30 km/h, so that the deceleration is largely reduced, provides the sudden braking type such that the driver screeches to a stop since the leading vehicle in front of the vehicle screeches to a stop. Accordingly, the stoppage average deceleration in a situation such that the driving characteristics of the driver do not appear to the data is removed so that the driving characteristics are determined. Thus, the driving characteristics of the driver are determined with high accuracy. Here, the information such that the vehicle speed does not exceed 30 km/h, and the driver puts on the acceleration pedal before the vehicle stops after the vehicle speed falls below 30 km/h corresponds to the operation information. The stoppage average deceleration corresponds to the speed relating information with respect to the driving operation.

Alternatively, when the comparison between the stoppage average deceleration and a standard value provides a gap equal to or larger than a predetermined value so that the stoppage average deceleration is extremely large, the stoppage average deceleration in the go-stop data in the go-stop section shown in the sudden braking type graph of FIG. 14F is not used for determining the driving characteristics. Thus, the stoppage average deceleration data in a situation such that the driving characteristics of the driver do not appear to the data is removed so that the driving characteristics are determined. Alternatively, when the comparison between the stoppage average deceleration, the startup average acceleration, the maximum acceleration or the maximum deceleration and a standard value provides a gap equal to or larger than a predetermined value so that the stoppage average deceleration the startup average acceleration, the maximum acceleration or the maximum deceleration is extremely small, a part of the data in a situation such that the driving characteristics of the driver do not appear to the data is removed so that the driving characteristics are determined. Here, the standard value provides a standard of the information about the vehicle speed, the acceleration and the deceleration in order to determine whether the data is suitable for determining the driving characteristics. The standard value is preliminary determined in view of the information about the vehicle speed, the acceleration and the deceleration when the vehicle runs according to each type graph in FIGS. 14A to 14H. For example, the standard value is defined as the average of the vehicle speed, the acceleration and the deceleration when the driver drives the vehicle according to various driving characteristics defined by various patterns in FIGS. 14A to 14H.

Further, regarding the go-stop data in the go-stop section represented by the twin-peak type graph in FIG. 14D and the zig-zag type graph in FIG. 14H, when the maximum vehicle speed does not exceed the standard value, the maximum vehicle speed data in the go-stop data is not used for determining the driving characteristics. Thus, the driving characteristics are determined according to the go-stop data without the maximum vehicle speed data in a situation such that the driving characteristics of the driver do not appear to the data.

When the acceleration opening degree becomes zero three times or more while the vehicle is accelerated in the go-stop section, e.g., when the opening degree of the acceleration pedal becomes zero three times or more within one minute before the vehicle speed reaches the maximum speed, all of the go-stop data in the go-stop section may not be used for determining the driving characteristics. In this case, the startup average acceleration may nit be used for determining the driving characteristics.

Further, based on the road conditions in the go-stop section, the controller 46 determines whether the go-stop data in the go-stop section is suitable for determining the driving characteristics. The controller 46 determines the driving characteristics based on the go-stop data without a part of the go-stop data in a situation such that the driving characteristics of the driver do not appear to the data. In this case, based on the map data input from the map data input unit 36, the controller 46 obtains the information about the road conditions corresponding to the go-stop section such as information of a slope of the road and information of a type of the road. Thus, the controller 46 corresponds to the road information obtaining unit and the third adaptation determination unit.

When the slope of the road is equal to or larger than a predetermined threshold, or when the type of the road is a narrow street such as a two-way traffic road, all of the go-stop data in the go-stop section is removed since disturbance is large. Thus, without the go-stop data in the above go-stop section, the driving characteristics are determined.

When the large number of go-stop data is used for determining the driving characteristics, the accuracy of determination of the driving characteristics increases. However, since the number of the go-stop data with removing the data not suitable for determining the driving characteristics is smaller than the number of the go-stop data, which does not include the data not suitable for determining the driving characteristics, the accuracy of determination of the driving characteristics may be lower. In the above embodiments, since the weight of the go-stop data with removing the data not suitable for determining the driving characteristics is lower than the weight of the go-stop data, which does not include the data not suitable for determining the driving characteristics, the reduction of accuracy of determination of the driving characteristics is restricted. Thus, the accuracy of determination of the driving characteristics is improved.

Further, the cost parameter corresponding to the driving characteristics of the driver specified with high accuracy in the controller 46 of the navigation device 3 is attached to each link data and each node data in the map data, so that the route is searched such that the total of the cost parameter attached to the link data and the node data is minimized. The route in accordance with the driving characteristics of the driver is accurately searched.

In the above embodiments, the controller 46 of the navigation device 3 executes the driving characteristics determination process. Alternatively, the controller 24 of the route guidance server 2 may execute the driving characteristics determination process. Alternatively, the driving characteristics determination process may be executed by an external device mounted on an outside of the vehicle, on which the navigation device 3 is mounted.

When the controller 24 of the route guidance server 2 executes the driving characteristics determination process, the driving condition information, the information about the current position of the vehicle, and the driver identification information (such as a user ID) are transmitted from the navigation device 3 to the route guidance server 2. Based on the driving condition information, the information about the current position of the vehicle, and the driver identification information, the controller 24 executes the driving characteristics determination process. When the controller 24 obtains the driving characteristics in the driving characteristics determination process, the information about the driving characteristics together with the user ID is stored I the memory such as the information memory 23. When the navigation device 3 requests to search the route, the controller 24 reads out the driving characteristics of the driver based on the user ID of the driver, and the controller 24 executes the cost determination process with using the driving characteristics.

In the above embodiments, the route guidance server 2 executes the cost determination process. Alternatively, the navigation device 3 may execute both of the cost determination process and the route search execution process. In this case, similar to a case where the controller 24 of the route guidance server 2 executes both of the cost determination process and the route search execution process, the controller 46 of the navigation device 3 executes both of the cost determination process and the route search execution process.

In the above case, the navigation device 3 includes a communication unit for communicating with the VICS center 1, and therefore, the navigation device 3 obtains the information about the traffic jam place and the degree of traffic jam via the VICS center 1. The navigation device 3 obtains the map data from the memory medium 37 via the map data input unit 36. Thus, the memory medium 37 provides the map data memory unit, and the navigation device 3 provides the route search device.

The above disclosure has the following aspects.

According to a first aspect of the present disclosure, a driving characteristics detector includes: a driving information obtaining element for obtaining driving information, which relates to a driving condition of a vehicle; and a driving characteristics determining element for determining driving characteristics of a driver of the vehicle based on the driving information. The driving information includes vehicle speed relating information, which relates to at least one of a vehicle speed, acceleration and deceleration of the vehicle. A driving unit section is defined as a section from the vehicle starts to go until the vehicle stops. The driving characteristics determining element determines the driving characteristics based on the vehicle speed relating information in each driving unit section.

In the above detector, the vehicle speed relating information in the driving unit section does not include information during the vehicle stops. Accordingly, when the driving characteristics are determined based on the vehicle speed relating information in each driving unit section, the driving characteristics are determined according to the vehicle speed relating information, which does not include the information in a stoppage time. The stoppage time is generated by the traffic limitation factor such as a stop sign and a traffic light. Accordingly, the driving characteristics are accurately determined without being affected by the traffic limitation factor.

Alternatively, the driving characteristics determining element may classify driving tendency of the driver according to a plurality of driving patterns based on the vehicle speed relating information in each driving unit section. Further, the plurality of driving patterns may include a fast driver pattern, a ordinary driver pattern and an eco driver pattern. The fast driver pattern presents the driving tendency such that the vehicle speed and the acceleration and the deceleration of the fast driver pattern are maximum, the eco driver pattern presents the driving tendency such that the vehicle speed and the acceleration and the deceleration of the eco driver pattern are minimum, and the ordinary driver pattern presents the driving tendency such that the vehicle speed and the acceleration and the deceleration of the ordinary driver pattern are disposed between the fast driver pattern and the eco driver pattern. The driving characteristics determining element specifies the driving tendency of the driver to one of the fast driver pattern, the ordinary driver pattern and the eco driver pattern.

Alternatively, the vehicle speed relating information may relate to at least the acceleration of the vehicle, and the driving characteristics determining element determines the driving characteristics based on acceleration relating information in each driving unit section. The driving tendency of the driver remarkably appears on the information about the acceleration of the vehicle. Thus, when the driving characteristics determining element determines the driving characteristics based on acceleration relating information, the driving characteristics are much accurately determined.

Alternatively, the vehicle speed relating information may include average acceleration data, average deceleration data, maximum acceleration data, maximum deceleration data and maximum vehicle speed data. The average acceleration data presents average acceleration within a predetermined period from the vehicle starts to run. The average deceleration data presents average deceleration within another predetermined period until the vehicle stops. The driving characteristics determining element determines the driving characteristics based on the average acceleration data, average deceleration data, maximum acceleration data, maximum deceleration data and maximum vehicle speed data in each driving unit section. The driving tendency of the driver remarkably appears on the average acceleration data, the average deceleration data, the maximum acceleration data, the maximum deceleration data and the maximum vehicle speed data. Thus, when the driving characteristics determining element determines the driving characteristics based on the average acceleration data, the average deceleration data, the maximum acceleration data, the maximum deceleration data and the maximum vehicle speed data, the driving characteristics are much accurately determined.

Alternatively, the driving characteristics detector may further include: a first adaptation determination element. The vehicle speed relating information includes a plurality of data. The first adaptation determination element determines based on the driving information in each driving unit section whether each data of the vehicle speed relating information in the driving unit section is suitable for determining the driving characteristics. The driving characteristics determining element determines the driving characteristics based on the vehicle speed relating information other than not-suitable data in each driving unit section. In this case, since the driving characteristics are determined without the data not suitable for the determination, the driving characteristics are much accurately determined. Further, the driving characteristics determining element may classify driving tendency of the driver according to a plurality of driving patterns based on the vehicle speed relating information in each driving unit section. The driving characteristics determining element evaluates a plurality of driving tendencies corresponding to a plurality of driving unit sections, respectively. The driving characteristics determining element weights the vehicle speed relating information when the driving characteristics determining element evaluates the plurality of driving tendencies in such a manner that a weight of the vehicle speed relating information other than not-suitable data in each driving unit section is lower than a weight of the vehicle speed relating information, which does not include not-suitable data. In this case, the accuracy of the determination of the driving characteristics is improved.

Alternatively, the vehicle speed relating information may include a plurality of data. The driving information further includes driving operation information, which affects on the vehicle speed of the vehicle, and the first adaptation determination element determines that one of data of the vehicle speed relating information in the driving unit section corresponding to driving operation is not suitable for determining the driving characteristics when the first adaptation determination element determines based on the driving operation information in the driving unit section that the driving operation is performed under a condition that the driving characteristics of the driver do not appear to the plurality of data.

Alternatively, the vehicle speed relating information may include a plurality of data. The first adaptation determination element compares one of data in the vehicle speed relating information in the driving unit section with a first threshold value. The first threshold value is a standard for determining whether the vehicle speed relating information is obtained under a condition that the driving characteristics of the driver do not appear to the plurality of data. The first adaptation determination element determines that the one of data of the vehicle speed relating information in the driving unit section is not suitable for determining the driving characteristics when the one of data in the vehicle speed relating information does not satisfies the first threshold value.

Alternatively, the vehicle speed relating information may include a plurality of data. The first adaptation determination element compares one of data in the vehicle speed relating information in the driving unit section with a standard value. The standard value is a standard for determining whether the vehicle speed relating information is suitable for determining the driving characteristics, and the first adaptation determination element determines that the one of data of the vehicle speed relating information in the driving unit section is not suitable for determining the driving characteristics when a gap between the one of data in the vehicle speed relating information and the standard value is equal to or larger than a predetermined value. In this case, the driving characteristics are determined without the data not suitable for the determination, so that the driving characteristics are much accurately determined.

Alternatively, the driving characteristics detector may further include: a second adaptation determination element. The second adaptation determination element determines based on the driving information in each driving unit section whether the vehicle speed relating information in the driving unit section is suitable for determining the driving characteristics. The driving characteristics determining element determines the driving characteristics based on the vehicle speed relating information other than not-suitable vehicle speed relating information in the driving unit section. In this case, the driving characteristics are determined without the data not suitable for the determination, so that the driving characteristics are much accurately determined. Further, the second adaptation determination element may compare the vehicle speed relating information in the driving unit section with a second threshold value. The second threshold value is a standard for determining whether the vehicle speed relating information is obtained under a condition that the driving characteristics of the driver do not appear to the vehicle speed relating information, and the second adaptation determination element determines that the vehicle speed relating information in the driving unit section is not suitable for determining the driving characteristics when the vehicle speed relating information does not satisfies the second threshold value.

Alternatively, the driving characteristics detector may further include: a road information obtaining element for obtaining road information, which relates to a road condition; and a third adaptation determination element. The third adaptation determination element determines based on the road information in each driving unit section whether the vehicle speed relating information in the driving unit section is suitable for determining the driving characteristics, and the driving characteristics determining element determines the driving characteristics based on the vehicle speed relating information other than not-suitable vehicle speed relating information in the driving unit section. In this case, the driving characteristics are determined without the data not suitable for the determination, so that the driving characteristics are much accurately determined. Further, the road information may include at least road slope data. The third adaptation determination element determines based on the road slope data in each driving unit section that the vehicle speed relating information in the driving unit section is not suitable for determining the driving characteristics when the road slope data in the driving unit section is equal to or larger than a predetermined value.

Alternatively, the road information may include at least road type data. The third adaptation determination element determines based on the road type data in each driving unit section that the vehicle speed relating information in the driving unit section is not suitable for determining the driving characteristics when the road type data in the driving unit section presents a narrow street.

According to a second aspect of the present disclosure, a route search device includes: the driving characteristics detector according to the first aspect of the present disclosure; a map data memory for storing map data, in which a road is presented by a plurality of links and a plurality of nodes; and a route search element for attaching a cost to each link and each node and for searching an optimum route to a destination. A total cost of the links and the nodes in the optimum route is minimum, and the route search element attaches the cost, which corresponds to the driving characteristics of the driver, to each link and each node.

The above device searches the optimum route in accordance with the driving characteristics of the driver.

Alternatively, the driving characteristics determining element may classify driving tendency of the driver according to a plurality of driving patterns based on the vehicle speed relating information in each driving unit section. The plurality of driving patterns include a fast driver pattern, a ordinary driver pattern and an eco driver pattern. The fast driver pattern presents the driving tendency such that the vehicle speed and the acceleration and the deceleration of the fast driver pattern are maximum. The eco driver pattern presents the driving tendency such that the vehicle speed and the acceleration and the deceleration of the eco driver pattern are minimum. The ordinary driver pattern presents the driving tendency such that the vehicle speed and the acceleration and the deceleration of the ordinary driver pattern are disposed between the fast driver pattern and the eco driver pattern. The driving characteristics determining element specifies the driving tendency of the driver to one of the fast driver pattern, the ordinary driver pattern and the eco driver pattern. The route search element searches the optimum route, in which the number of stops of the vehicle is minimum, when the driving tendency of the driver is specified to the fast driver pattern. In this case, the mental stress of the driver is reduced when the driving tendency of the driver is specified to the fast driver pattern.

Further, the route search element may increase at least one of a cost of a link, in which the number of traffic lights is equal to or larger than a predetermined value, a cost of a node, at which a stop sign exists, a cost of a link, which includes a stop sign, and a cost of a node, at which the vehicle turns right or left, when the driving tendency of the driver is specified to the fast driver pattern, so that the route search element searches the optimum route, in which the number of stops of the vehicle is minimum, when the driving tendency of the driver is specified to the fast driver pattern.

Alternatively, the route search device may further include: a traffic jam information obtaining element for obtaining information about a traffic jam place. The driving characteristics determining element classifies driving tendency of the driver according to a plurality of driving patterns based on the vehicle speed relating information in each driving unit section. The plurality of driving patterns include a fast driver pattern, a ordinary driver pattern and an eco driver pattern. The fast driver pattern presents the driving tendency such that the vehicle speed and the acceleration and the deceleration of the fast driver pattern are maximum. The eco driver pattern presents the driving tendency such that the vehicle speed and the acceleration and the deceleration of the eco driver pattern are minimum. The ordinary driver pattern presents the driving tendency such that the vehicle speed and the acceleration and the deceleration of the ordinary driver pattern are disposed between the fast driver pattern and the eco driver pattern. The driving characteristics determining element specifies the driving tendency of the driver to one of the fast driver pattern, the ordinary driver pattern and the eco driver pattern. The route search element searches the optimum route, in which the number of traffic jam places is minimum, based on the information about the traffic jam place when the driving tendency of the driver is specified to the fast driver pattern. In this case, the mental stress of the driver is reduced when the driving tendency of the driver is specified to the fast driver pattern.

Alternatively, the route search element may increase a cost of a link, which includes a traffic jam place when the driving tendency of the driver is specified to the fast driver pattern, so that the route search element searches the optimum route, in which the number of traffic jam places is minimum, based on the information about the traffic jam place when the driving tendency of the driver is specified to the fast driver pattern.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A driving characteristics detector comprising:
a central processing unit (CPU), the CPU is configured to
obtain, in a driving information obtaining element, driving information, which relates to a driving condition of a vehicle; and
determine, in a driving characteristics determining element, driving characteristics of a driver of the vehicle based on the driving information,
wherein the driving information includes vehicle speed relating information, which relates to at least one of a vehicle speed, acceleration and deceleration of the vehicle,
wherein a driving unit section is defined as a section from the vehicle starts to go until the vehicle stops, and
wherein the driving characteristics determining element determines the driving characteristics based on the vehicle speed relating information in each driving unit section;
wherein the CPU is further configured to
determine, in a second adaptation determination element, based on the driving information in each driving unit section whether the vehicle speed relating information in the driving unit section is suitable for determining the driving characteristics, wherein the second adaptation determining element determines that the vehicle speed relating information is not suitable for determining the driving characteristics when the vehicle speed does not exceed a predetermined value, wherein the driving characteristics determining element determines the driving characteristics based on the vehicle speed relating information other than not-suitable vehicle speed relating information in the driving unit section.

2. The driving characteristics detector according to claim 1, wherein the driving characteristics determining element classifies driving tendency of the driver according to a plurality of driving patterns based on the vehicle speed relating information in each driving unit section.

3. The driving characteristics detector according to claim 2, wherein the plurality of driving patterns include a fast driver pattern, a ordinary driver pattern and an eco driver pattern, wherein the fast driver pattern presents the driving tendency such that the vehicle speed and the acceleration and the deceleration of the fast driver pattern are maximum, wherein the eco driver pattern presents the driving tendency such that the vehicle speed and the acceleration and the deceleration of the eco driver pattern are minimum, wherein the ordinary driver pattern presents the driving tendency such that the vehicle speed and the acceleration and the deceleration of the ordinary driver pattern are disposed between the fast driver pattern and the eco driver pattern, and wherein the driving characteristics determining element specifies the driving tendency of the driver to one of the fast driver pattern, the ordinary driver pattern and the eco driver pattern.

4. The driving characteristics detector according to claim 1, wherein the vehicle speed relating information relates to at least the acceleration of the vehicle, and wherein the driving characteristics determining element determines the driving characteristics based on acceleration relating information in each driving unit section.

5. The driving characteristics detector according to claim 1, wherein the vehicle speed relating information includes average acceleration data, average deceleration data, maximum acceleration data, maximum deceleration data and maximum vehicle speed data, wherein the average acceleration data presents average acceleration within a predetermined period from the vehicle starts to run, wherein the average deceleration data presents average deceleration within another predetermined period until the vehicle stops, and wherein the driving characteristics determining element determines the driving characteristics based on the average acceleration data, average deceleration data, maximum acceleration data, maximum deceleration data and maximum vehicle speed data in each driving unit section.

6. The driving characteristics detector according to claim 1, further comprising:

a first adaptation determination element, wherein the vehicle speed relating information includes a plurality of data, wherein the first adaptation determination element determines based on the driving information in each driving unit section whether each data of the vehicle speed relating information in the driving unit section is suitable for determining the driving characteristics, and wherein the driving characteristics determining element determines the driving characteristics based on the vehicle speed relating information other than not-suitable data in each driving unit section.

7. The driving characteristics detector according to claim 6, wherein the driving characteristics determining element classifies driving tendency of the driver according to a plurality of driving patterns based on the vehicle speed relating information in each driving unit section, wherein the driving characteristics determining element evaluates a plurality of driving tendencies corresponding to a plurality of driving unit sections, respectively, and wherein the driving characteristics determining element weights the vehicle speed relating information when the driving characteristics determining element evaluates the plurality of driving tendencies in such a manner that a weight of the vehicle speed relating information other than not-suitable data in each driving unit section is lower than a weight of the vehicle speed relating information, which does not include not-suitable data.

8. The driving characteristics detector according to claim 6, wherein the vehicle speed relating information includes a plurality of data, wherein the driving information further includes driving operation information, which affects on the vehicle speed of the vehicle, and wherein the first adaptation determination element determines that one of data of the vehicle speed relating information in the driving unit section corresponding to driving operation is not suitable for determining the driving characteristics when the first adaptation determination element determines based on the driving operation information in the driving unit section that the driving operation is performed under a condition that the driving characteristics of the driver do not appear to the plurality of data.

9. The driving characteristics detector according to claim 6, wherein the vehicle speed relating information includes a plurality of data, wherein the first adaptation determination element compares one of data in the vehicle speed relating information in the driving unit section with a first threshold value, wherein the first threshold value is a standard for determining whether the vehicle speed relating information is obtained under a condition that the driving characteristics of the driver do not appear to the plurality of data, and wherein the first adaptation determination element determines that the one of data of the vehicle speed relating information in the driving unit section is not suitable for determining the driving characteristics when the one of data in the vehicle speed relating information does not satisfies the first threshold value.

10. The driving characteristics detector according to claim 6, wherein the vehicle speed relating information includes a plurality of data, wherein the first adaptation determination element compares one of data in the vehicle speed relating information in the driving unit section with a standard value, wherein the standard value is a standard for determining whether the vehicle speed relating information is suitable for determining the driving characteristics, and wherein the first adaptation determination element determines that the one of data of the vehicle speed relating information in the driving unit section is not suitable for determining the driving characteristics when a gap between the one of data in the vehicle speed relating information and the standard value is equal to or larger than a predetermined value.

11. The driving characteristics detector according to claim 1, wherein the second adaptation determination element compares the vehicle speed relating information in the driving unit section with a second threshold value, wherein the second threshold value is a standard for determining whether the vehicle speed relating information is obtained under a condition that the driving characteristics of the driver do not appear to the vehicle speed relating information, and wherein the second adaptation determination element determines that the vehicle speed relating information in the driving unit section is not suitable for determining the driving characteristics when the vehicle speed relating information does not satisfies the second threshold value.

12. The driving characteristics detector according to claim 1, the CPU further being configured to:

obtain, in a road information obtaining element, road information, which relates to a road condition; and determine, in a third adaption determation element, based on the road information in each driving unit section whether the vehicle speed relating information in the driving unit section is suitable for determining the driving characteristics, and wherein the driving characteristics determining element determines the driving characteristics based on the vehicle speed relating information other than not-suitable vehicle speed relating information in the driving unit section.

13. The driving characteristics detector according to claim 12, wherein the road information includes at least road slope data, and wherein the third adaptation determination element determines based on the road slope data in each driving unit section that the vehicle speed relating information in the driving unit section is not suitable for determining the driving characteristics when the road slope data in the driving unit section is equal to or larger than a predetermined value.

14. The driving characteristics detector according to claim 12, wherein the road information includes at least road type data, and wherein the third adaptation determination element determines based on the road type data in each driving unit section that the vehicle speed relating information in the driving unit section is not suitable for determining the driving characteristics when the road type data in the driving unit section presents a narrow street.

15. A route search device comprising:

the driving characteristics detector according to claim 1;

a map data memory for storing map data, in which a road is presented by a plurality of links and a plurality of nodes; and a route search element for attaching a cost to each link and each node and for searching an optimum route to a destination, wherein a total cost of the links and the nodes in the optimum route is minimum, and wherein the route search element attaches the cost, which corresponds to the driving characteristics of the driver, to each link and each node.

16. The route search device according to claim 15, wherein the driving characteristics determining element classifies driving tendency of the driver according to a plurality of driving patterns based on the vehicle speed relating information in each driving unit section, wherein the plurality of driving patterns include a fast driver pattern, a ordinary driver pattern and an eco driver pattern, wherein the fast driver pattern presents the driving tendency such that the vehicle speed and the acceleration and the deceleration of the fast driver pattern are maximum, wherein the eco driver pattern presents the driving tendency such that the vehicle speed and the acceleration and the deceleration of the eco driver pattern are minimum, wherein the ordinary driver pattern presents the driving tendency such that the vehicle speed and the acceleration and the deceleration of the ordinary driver pattern are disposed between the fast driver pattern and the eco driver pattern, wherein the driving characteristics determining element specifies the driving tendency of the driver to one of the fast driver pattern, the ordinary driver pattern and the eco driver pattern, wherein the route search element searches the optimum route, in which the number of stops of the vehicle is minimum, when the driving tendency of the driver is specified to the fast driver pattern.

17. The route search device according to claim 16, wherein the route search element increases at least one of a cost of a link, in which the number of traffic lights is equal to or larger than a predetermined value, a cost of a node, at which a stop sign exists, a cost of a link, which includes a stop sign, and a cost of a node, at which the vehicle turns right or left, when the driving tendency of the driver is specified to the fast driver pattern, so that the route search element searches the optimum route, in which the number of stops of the vehicle is minimum, when the driving tendency of the driver is specified to the fast driver pattern.

18. The route search device according to claim 15, further comprising:

a traffic jam information obtaining element for obtaining information about a traffic jam place, wherein the driving characteristics determining element classifies driving tendency of the driver according to a plurality of driving patterns based on the vehicle speed relating information in each driving unit section, wherein the plurality of driving patterns include a fast driver pattern, a ordinary driver pattern and an eco driver pattern, wherein the fast driver pattern presents the driving tendency such that the vehicle speed and the acceleration and the deceleration of the fast driver pattern are maximum, wherein the eco driver pattern presents the driving tendency such that the vehicle speed and the acceleration and the deceleration of the eco driver pattern are minimum, wherein the ordinary driver pattern presents the driving tendency such that the vehicle speed and the acceleration and the deceleration of the ordinary driver pattern are disposed between the fast driver pattern and the eco driver pattern, wherein the driving characteristics determining element specifies the driving tendency of the driver to one of the fast driver pattern, the ordinary driver pattern and the eco driver pattern, and wherein the route search element searches the optimum route, in which the number of traffic jam places is minimum, based on the information about the traffic jam place when the driving tendency of the driver is specified to the fast driver pattern.

19. The route search device according to claim 18, wherein the route search element increases a cost of a link, which includes a traffic jam place when the driving tendency of the driver is specified to the fast driver pattern, so that the route search element searches the optimum route, in which the number of traffic jam places is minimum, based on the information about the traffic jam place when the driving tendency of the driver is specified to the fast driver pattern.

20. A driving characteristics detector comprising:

a central processing unit (CPU), the CPU is configured to
obtain, in a driving information obtaining element, driving information, which relates to a driving condition of a vehicle; and
determine, in a driving characteristics determining element, driving characteristics of a driver of the vehicle based on the driving information, wherein the driving information includes vehicle speed relating information, which relates to at least one of a vehicle speed, acceleration and deceleration of the vehicle, wherein a driving unit section is defined as a section from the vehicle starts to go until the vehicle stops, and wherein the driving characteristics determining element determines the driving characteristics based on the vehicle speed relating information in each driving unit section;

wherein the CPU is further configured to
determine, in a second adaptation determination element, based on the driving information in each driving unit section whether the vehicle speed relating information in the driving unit section is suitable for determining the driving characteristics, wherein the second adaptation determining element determines that the vehicle speed relating information is not suitable for determining the driving characteristics when a brake operation is performed in a startup period, wherein the driving characteristics determining element determines the driving characteristics based on the vehicle speed relating information other than not-suitable vehicle speed relating information in the driving unit section.

21. A driving characteristics detector comprising:

a central processing unit (CPU), the CPU is configured to
obtain, in a driving information obtaining element, driving information, which relates to a driving condition of a vehicle; and
determine, in a driving characteristics determining element, driving characteristics of a driver of the vehicle based on the driving information, wherein the driving information includes vehicle speed relating information, which relates to at least one of a vehicle speed, acceleration and deceleration of the vehicle, wherein a driving unit section is defined as a section from the vehicle starts to go until the vehicle stops, and wherein the driving characteristics determining element determines the driving characteristics based on the vehicle speed relating information in each driving unit section;

wherein the CPU is further configured to
determine, in a second adaptation determination element, based on the driving information in each driving unit section whether the vehicle speed relating information in the driving unit section is suitable for determining the driving characteristics, wherein the second adaptation determining element determines that the vehicle speed relating information is not suitable for determining the driving characteristics when a stoppage deceleration is equal to or larger than a predetermined value, wherein the driving characteristics determining element determines the driving characteristics based on the vehicle speed relating information other than not-suitable vehicle speed relating information in the driving unit section.

22. A driving characteristics detector comprising:

a central processing unit (CPU), the CPU is configured to
obtain, in a driving information obtaining element, driving information, which relates to a driving condition of a vehicle; and
determine, in a driving characteristics determining element, driving characteristics of a driver of the vehicle based on the driving information, wherein the driving information includes vehicle speed relating information, which relates to at least one of a vehicle speed, acceleration and deceleration of the vehicle, wherein a driving unit section is defined as a section from the vehicle starts to go until the vehicle stops, and wherein the driving characteristics determining element determines the driving characteristics based on the vehicle speed relating information in each driving unit section;

wherein the CPU is further configured to
determine, in a second adaptation determination element, based on the driving information in each driving unit section whether the vehicle speed relating information in the driving unit section is suitable for determining the driving characteristics, wherein the second adaptation determining element determines that the vehicle speed relating information is not suitable for determining the driving characteristics when an acceleration opening degree becomes zero predetermined times or more, wherein the driving characteristics determining element determines the driving characteristics based on the vehicle speed relating information other than not-suitable vehicle speed relating information in the driving unit section.

* * * * *